(12) United States Patent
Stauss et al.

(10) Patent No.: US 12,174,332 B2
(45) Date of Patent: Dec. 24, 2024

(54) APPARATUS AND METHOD FOR MAPPING OBJECTS BEHIND AN OPAQUE SURFACE

(71) Applicant: Zircon Corporation, Campbell, CA (US)

(72) Inventors: John Robert Stauss, Los Gatos, CA (US); Micaela G. Kapp, San Jose, CA (US)

(73) Assignee: Zircon Corporation, Campbell, CA (US)

( * ) Notice: Subject to any disclaimer, the term of this patent is extended or adjusted under 35 U.S.C. 154(b) by 150 days.

(21) Appl. No.: 17/972,740

(22) Filed: Oct. 25, 2022

(65) Prior Publication Data

US 2023/0049709 A1 Feb. 16, 2023

Related U.S. Application Data

(63) Continuation-in-part of application No. 16/698,751, filed on Nov. 27, 2019, now Pat. No. 11,512,978.

(51) Int. Cl.
*G01V 3/02* (2006.01)

(52) U.S. Cl.
CPC ...................... *G01V 3/02* (2013.01)

(58) Field of Classification Search
USPC ............... 116/204; 324/658, 660–663, 67
See application file for complete search history.

(56) References Cited

U.S. PATENT DOCUMENTS

| 5,619,128 A | 4/1997 | Heger |
| 6,215,293 B1 | 4/2001 | Yim |
| 6,933,712 B2 | 4/2005 | Miller et al. |
| 6,894,508 B2 | 5/2005 | Sanoner et al. |
| 7,504,817 B2 | 3/2009 | Sanoner et al. |
| 7,583,071 B2 | 9/2009 | Skultety-Betz et al. |
| 7,671,577 B2 | 3/2010 | Skultety-Betz et al. |
| 7,701,191 B2 | 4/2010 | Skultety-Betz et al. |
| 7,764,061 B2 | 7/2010 | Skultety-Betz et al. |
| 7,812,722 B2 | 10/2010 | Krantz |

(Continued)

OTHER PUBLICATIONS

International Search Report and Written Opinion dated Feb. 1, 2021, from PCT Application No. PCT/US2020/58677, filed Nov. 3, 2020.

(Continued)

*Primary Examiner* — Vincent Q Nguyen
(74) *Attorney, Agent, or Firm* — Silicon Valley Patent Group LLP; Thomas C. Chan

(57) ABSTRACT

Aspects of the present invention include an apparatus and method for mapping objects behind an opaque surface, comprising, generating location data by a location tracker, where the location data includes pairs of horizontal and vertical location data relative to a point of reference that is linked to the opaque surface; collecting sensor data corresponding to the location data in parallel, by a sensor device comprising one or more sensors and held by the location tracker, of the objects behind the opaque surface along a programmed scan path; storing, in a memory, the sensor data and the location data; analyzing, by one or more processors, the sensor data and the location data to identify information about the objects behind the opaque surface; and communicating, via a user interface, the information about the objects behind the opaque surface to a user.

22 Claims, 23 Drawing Sheets

(56) References Cited

U.S. PATENT DOCUMENTS

| | | |
|---|---|---|
| 7,977,938 B2 | 7/2011 | Sanoner et al. |
| 8,274,273 B2 | 9/2012 | Nguyen et al. |
| 8,546,759 B2 | 10/2013 | Skultety-Betz et al. |
| 9,959,591 B2 | 5/2018 | Sendai |
| 2003/0218469 A1 | 11/2003 | Brazell et al. |
| 2007/0210785 A1 | 9/2007 | Sanover et al. |
| 2011/0311328 A1 | 12/2011 | Barr et al. |
| 2013/0321621 A1 | 12/2013 | Menzel |
| 2014/0043046 A1* | 2/2014 | Adams .................. G01R 27/04 324/642 |
| 2014/0145704 A1 | 5/2014 | Krapf et al. |
| 2016/0077232 A1 | 3/2016 | Wingate et al. |
| 2016/0103215 A1 | 4/2016 | Watts et al. |
| 2018/0130196 A1 | 5/2018 | Loveland et al. |
| 2019/0021631 A1 | 1/2019 | Cohen et al. |
| 2019/0063679 A1 | 2/2019 | Mergener |
| 2019/0219721 A1 | 7/2019 | Dorrough et al. |

OTHER PUBLICATIONS

International Preliminary Report on Patentability dated Jun. 9, 2022, from PCT Application No. PCT/US2020/58677, filed Nov. 3, 2020.

International Search Report & Written Opinion dated May 10, 2024, from PCT Application No. PCT/US23/77584, Filed Oct. 24, 2023.

* cited by examiner

APPARATUS AND METHOD FOR MAPPING OBJECTS BEHIND AN OPAQUE SURFACE

CROSS-REFERENCE TO RELATED APPLICATIONS

This is a continuation-in-part application of U.S. patent application Ser. No. 16/698,751, "Scanner for Differentiating Objects Detected behind an Opaque Surface," filed Nov. 27, 2019. The aforementioned United States patent application is assigned to the assignee hereof and is hereby incorporated by reference in its entirety.

FIELD

The present invention relates to the field of mapping objects behind an opaque surface.

BACKGROUND

Stud finders have been commonly used in construction and home improvement industries. FIG. 1 illustrates a side view of a conventional scanner. As shown in FIG. 1, a scanner 102 may be used in a construction and home improvement environment 100. For example, scanner 102 may be configured to detect an object 101 behind an opaque surface 103. In some exemplary applications, object 101 may be a stud, an electrical wire, or a metal pipe. In one exemplary embodiment, the stud may be a wooden stud, vertical wooden element, bridging block, fire block, or any other block, joists, rafters, headers, posts, columns, let brace, or any similar wooden element used for integrity, fabrication, or maintenance of a structural element. In one exemplary embodiment, opaque surface 103 may be, for example, a wall covered with drywall, particle board, or plywood; as an example, a floor with opaque material attached to structural members; as an example, a ceiling with an opaque surface, attached to rafters; or any other opaque surface behind which objects are not visible through the surface.

In one exemplary embodiment, scanner 102 may include a housing to enclose and protect various electronic components. For example, within the housing of the scanner 102, it may include a printed circuit board (PCB) 104, which can be configured to hold the various electronic components, such as one or more capacitive sensor(s) 108, one or more metal sensors 109, one or more current sensors (not shown), a controller/processor and other integrated circuits (labelled as 106a and 106b). The PCB 104 may be coupled to a battery 107, which provides power to the scanner 102. In conventional applications, the one or more capacitive sensor (s) 108, one or more metal sensors 109, and one or more current sensors are typically operated individually or separately. However, such conventional applications may be insufficient to address the complexity of differentiating one or more objects behind the opaque surface 103.

In addition, remodeling and construction projects often require knowledge of hidden structures (such as structural framing, plumbing, wiring, etc.) behind the surface of a wall, floor or ceiling. These hidden structures maybe made of different materials like wood, plastic or metal. Accurate location data for these structures can be invaluable prior to cutting or drilling into the surface in order to avoid costly damages, rework, or safety hazards. Conventional scanners may be able to define the nature of a hidden object at a point directly under the scanning device. They are unable to provide assistance beyond the immediate point and time of their use, because they do not store such location data and sensor data for future use.

Therefore, there is a need for apparatuses and methods that can address the above drawbacks of the conventional scanner in mapping objects behind an opaque surface.

SUMMARY

Aspects of the present disclosure include an exemplary apparatus for mapping objects behind an opaque surface, comprising: a location tracker configured to generate location data, where the location data includes pairs of horizontal and vertical location data relative to a point of reference that is linked to the opaque surface; a sensor device configured to collect sensor data of the objects behind the opaque surface along a programmed scan path, where the sensor data corresponds to the location data, and the sensor device comprises one or more sensors and is held by the location tracker; a memory configured to store the sensor data and the location data; one or more processors configured to analyze the sensor data and the location data to identify information about the objects behind the opaque surface; and a user interface configured to communicate the information about the objects behind the opaque surface to a user.

Aspects of the present invention include a method for mapping objects behind an opaque surface, comprising: generating location data by a location tracker, where the location data includes pairs of horizontal and vertical location data relative to a point of reference that is linked to the opaque surface; collecting sensor data corresponding to the location data in parallel, by a sensor device comprising one or more sensors and held by the location tracker, of the objects behind the opaque surface along a programmed scan path; storing, in a memory, the sensor data and the location data; analyzing, by one or more processors, the sensor data and the location data to identify information about the objects behind the opaque surface; and communicating, via a user interface, the information about the objects behind the opaque surface to a user.

BRIEF DESCRIPTION OF THE DRAWINGS

The aforementioned features and advantages of the invention, as well as additional features and advantages thereof, will be more clearly understandable after reading detailed descriptions of embodiments of the invention in conjunction with the non-limiting and non-exhaustive aspects of the following drawings. Like numbers are used throughout the disclosure.

DESCRIPTION OF EMBODIMENTS

Methods and apparatuses are provided for mapping objects detected behind an opaque surface. The following descriptions are presented to enable a person skilled in the art to make and use the invention. Descriptions of specific embodiments and applications are provided only as examples. Various modifications and combinations of the examples described herein may be readily apparent to those skilled in the art, and the general principles defined herein may be applied to other examples and applications without departing from the scope of the invention. Thus, the present invention is not intended to be limited to the examples described and shown, but is to be accorded the scope consistent with the principles and features disclosed herein.

The word "exemplary" or "example" is used herein to mean "serving as an example, instance, or illustration." Any aspect or embodiment described herein as "exemplary" or as an "example" is not necessarily to be construed as preferred or advantageous over other aspects or embodiments.

Some portions of the detailed description that follow are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

The drawings are presented for illustration purposes, and they are not drawn to scale. In some examples, rectangles, circles or other shapes are used to illustrate shapes of objects and their respective estimated shapes of the objects. In real world applications, the shapes of objects and their respective estimated shapes of the objects may be irregular and may be in any shapes or forms. Note that in the following figures, for each object, a section of the object, not the entire object, is shown. This also applies to the respective estimated shape of each object.

Figure 1:
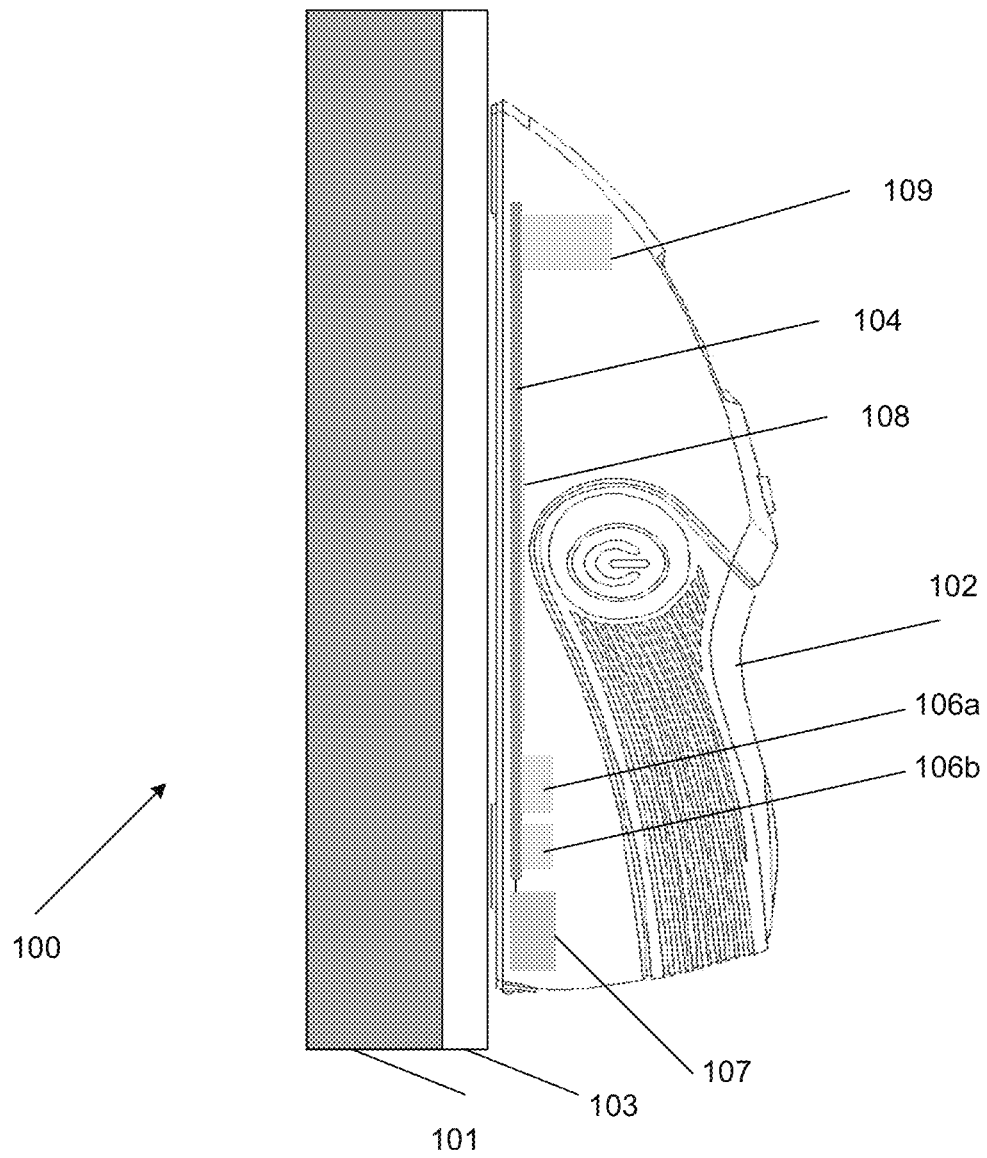
FIG. 1 illustrates a side view of a conventional scanner.
Figure 2A:
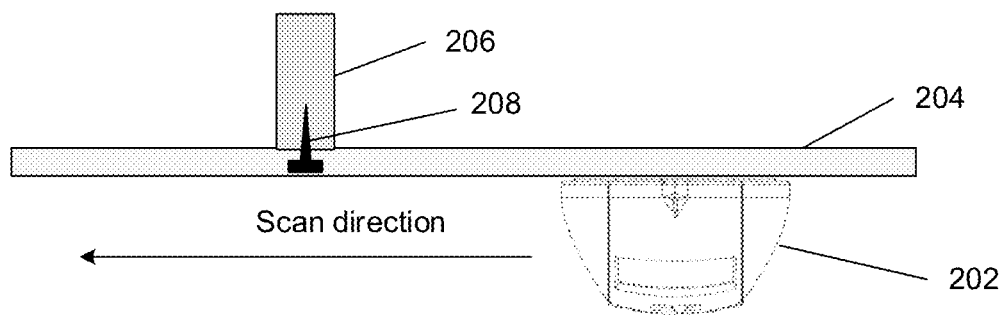
FIG. 2A illustrates a top view of an exemplary embodiment for differentiating one or more objects detected behind an opaque surface according to aspects of the present invention.

FIG. 2A illustrates a top view of an exemplary embodiment for differentiating one or more objects detected behind an opaque surface according to aspects of the present invention. As shown in FIG. 2A, the exemplary embodiment may include a scanner 202 an opaque surface 204, and one or more objects (labelled as 206, 208) behind the opaque surface 204. The scanner 202 may be configured to differentiate a variety of objects detected behind the opaque surface, including but not limited to, for example: 1) wood studs, wood joists, wood rafters; 2) metallic objects; 3) electrical wires; or 4) other objects. In the example of FIG. 2A, object 206 may be a wood stud, and object 208 may be a metal pipe.

Figure 2B:
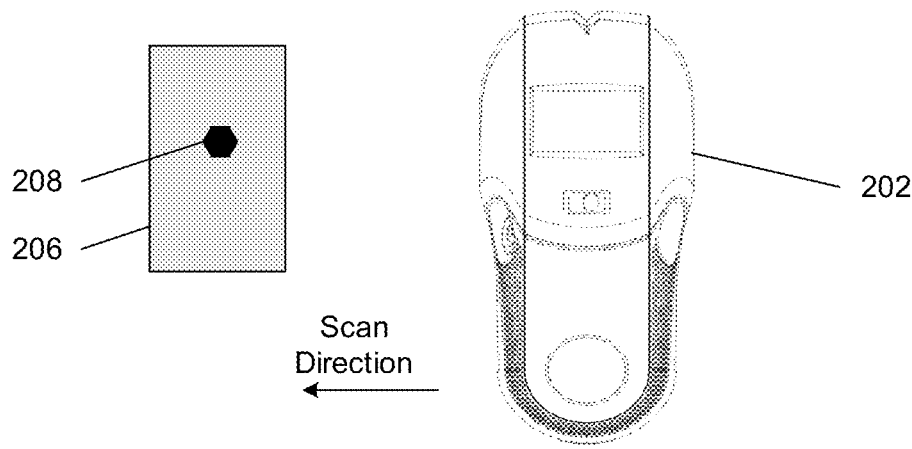
FIG. 2B illustrates a front view of the exemplary embodiment of FIG. 2A for differentiating one or more objects detected behind an opaque surface according to aspects of the present invention.

FIG. 2B illustrates a front view of the exemplary embodiment of FIG. 2A for detecting different objects behind an opaque surface according to aspects of the present invention. In the example of FIG. 2B, the opaque surface is not shown for simplicity. As shown in FIG. 2A and FIG. 2B, the scan direction may be from right to left. A person skilled in the art would understand that the scan direction may be adjusted based on the working environment, the preference of the user, and the specific application. In other words, the scan direction may be from left to right, right to left, up to down, down to up, or diagonally. In some applications, a user may perform multiple scans and/or from multiple directions to improve the accuracy of sensor data collected.

Figure 2C:
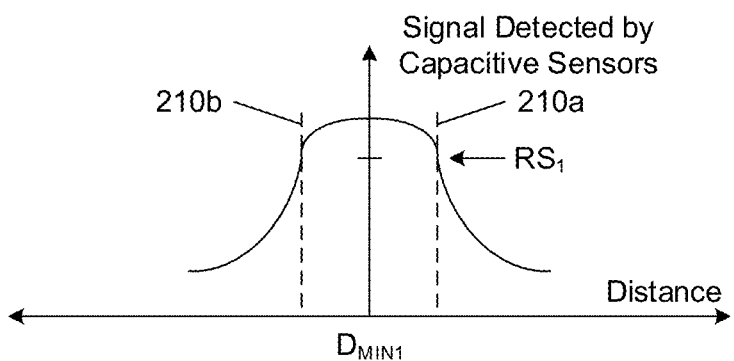
FIG. 2C illustrates a first set of sensor data collected by the scanner of FIG. 2B according to aspects of the present invention.

FIG. 2C illustrates a first set of sensor data collected by the scanner of FIG. 2B according to aspects of the present invention. In this example, the sensor data may be collected by one or more capacitive sensors of the scanner 202; and one or more items may be included in a set. The signal may represent a change of capacitance due to the change in the density of the objects behind the opaque surface, which may include an indication of the density of object 206 and object 208. The vertical axis represents a magnitude of the signal observed by the capacitive sensors, and the horizontal axis represents a distance of the capacitive sensors from the objects being detected. As the scanner 202 scans from right to left (as shown in FIG. 2B), the magnitude of the signal being observed by the capacitive sensors increases, reaching a plateau when the scanner is approximately above the center of the objects. As the scanner 202 continues to move past the center of the objects, the magnitude of the signal being observed by the capacitive sensors decreases.

According to aspects of the present invention, a first reference signal strength ($RS_1$) may be used to identify the boundaries of object 206. For example, the region between the two dashed lines 210a and 210b has a signal strength at or above $RS_1$, and this region may be estimated to be where object 206 is located. On the other hand, the region outside of the two dashed lines 210a and 210b has a signal strength below $RS_1$, and this region may be estimated to be where object 206 is not found. When the signal magnitude detected by the capacitive sensors reaches the first reference signal strength $RS_1$, object 206 behind the opaque surface may be detected and the boundaries of object 206 may be recorded, as indicated by the dashed lines 210a and 210b in FIG. 2C.

Note that the first reference signal strength $RS_1$ may be derived from empirical experimental data. The first reference signal strength $RS_1$ may be programmable, and may be revised via a software update even after the scanner has been sold, the delivery methods of which are well known to those skilled in the art. At the center of the graph, the distance $D_{MIN1}$ represent a minimum distance between the capacitive sensors of the scanner 202 and the approximate center of the objects. Note that although a right to left scan is described in this example, similar observations may be obtained by a scan from left to right. In some applications, multiple scans from different directions may be used to improve the accuracy of the estimated boundaries of object 206.

Figure 2D:
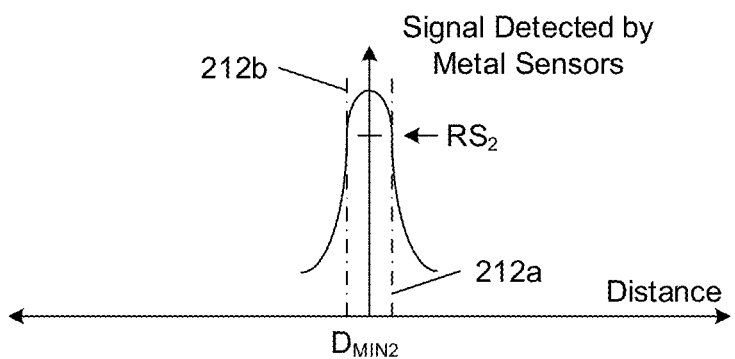
FIG. 2D illustrates a second set of sensor data collected by the scanner of FIG. 2B according to aspects of the present invention.

FIG. 2D illustrates a second set of sensor data collected by the scanner of FIG. 2B according to aspects of the present invention. In the example of FIG. 2D, the sensor data may be collected by one or more metal sensors of scanner 202; and one or more items may be included in a set. The signal may represent a magnetic field detected behind the opaque surface, primarily affected by the existence of a metal object, such as object 208. The vertical axis represents the magnitude of the signal observed by the metal sensors, and the horizontal axis represents the distance of the metal sensors from object 208. As scanner 202 scans from right to left (as shown in FIG. 2B), the magnitude of the signal being observed by the metal sensors increases, reaching a plateau when the scanner is approximately above the center of object 208. As scanner 202 continues to move past the center of object 208, the magnitude of the signal being observed by the metal sensors decreases.

According to aspects of the present invention, a second reference signal strength ($RS_2$) may be used to identify the boundaries of object 208. For example, the region between the two dashed lines 212a and 212b has a signal strength at or above $RS_2$, and this region may be estimated to be where object 208 is located. On the other hand, the region outside of the two dashed lines 212a and 212b has a signal strength below $RS_2$, and this region may be estimated to be where object 208 is not found. When the signal magnitude detected by the metal sensors reaches the second reference signal strength $RS_2$, object 208 behind the opaque surface may be detected, and the boundaries of object 208 may be recorded, as indicated by the dashed lines 212a and 212b in FIG. 2D.

Note that the second reference signal strength $RS_2$ may be derived from empirical experimental data. The second reference signal strength $RS_2$ may be programmable, and may be revised via a software update even after the scanner 202 has been sold, the delivery methods of which are well known to those skilled in the art. At the center of the graph, the distance $D_{MIN2}$ represents a minimum distance between the metal sensors of scanner 202 and the approximate center of object 208. Note that although a right to left scan is described in this example, similar observations may be obtained by a scan from left to right. In some applications, multiple scans from different directions may be used to improve the accuracy of the estimated boundaries of object 208.

Figure 3A:
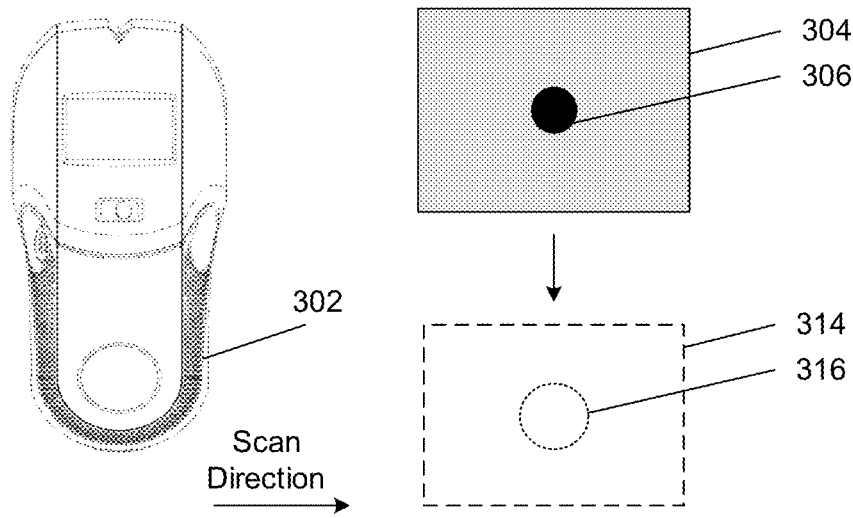
FIG. 3A illustrates a front view of another exemplary embodiment for differentiating one or more objects detected behind an opaque surface according to aspects of the present invention.

FIG. 3A illustrates a front view of another exemplary embodiment for detecting different objects behind an opaque surface according to aspects of the present invention. As shown in FIG. 3A, the exemplary embodiment may include a scanner 302 and one or more objects (labelled as 304 and 306) behind an opaque surface. Note that, for simplicity, the opaque surface is not shown. Object 304 may be a wood stud, and object 306 may be a metal pipe. The scan direction may be from left to right. The method described above in association with FIG. 2A to FIG. 2D may be employed to determine an estimated region for each object behind the opaque surface, which is not repeated here. In this example, rectangle 314 represents an estimated region of object 304, and circle 316 represents an estimated region of object 306.

Figure 3B:
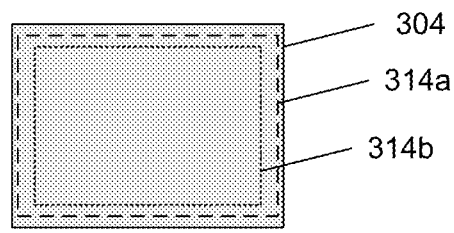
FIG. 3B illustrates an exemplary embodiment of determining an estimated region of an object of FIG. 3A according to aspects of the present invention.

FIG. 3B illustrates an exemplary method of determining an estimated region of an object of FIG. 3A according to aspects of the present invention. As shown in FIG. 3B, the method of determining the estimated region of object 304 is used as an example. Compared to the actual object 304, a first estimated region 314a can be determined by employing the first reference signal strength ($RS_1$) as described in association with FIG. 2C. Since the first reference signal strength may be programmable, for a wood stud, it can be programmed to provide the first estimated region 314a to be smaller than the actual object 304. By choosing the first estimated region 314a to be smaller than the actual object 304, this approach can provide the benefit of having a higher level of confidence that a wood stud is hit when a user drills into the opaque surface.

Additionally or optionally, a second estimated region 314b can be determined by inserting a safety margin. This safety margin is represented by the area between the first estimated region 314a and the second estimated region 314b. Various factors may be used to determine the safety margin, including but not limited to: 1) type of material of the opaque surface; 2) humidity of the environment; 3) temperature of the environment; or 4) other factors that may affect the accuracy of determining the estimated region of object 304. The safety margin may add 2 mm, 4 mm, or other measurements on each side of the first estimated region to form the second estimated region based on the above factors and the design criteria for the scanner. Depending on the application, either the first estimated region 314a or the second estimated region 314b may be used to represent the estimated region of object 304.

Figure 3C:
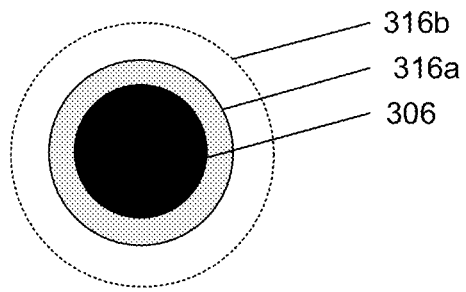
FIG. 3C illustrates another exemplary embodiment of determining an estimated region of another object of FIG. 3A according to aspects of the present invention.

FIG. 3C illustrates another exemplary method of determining an estimated region of another object of FIG. 3A according to aspects of the present invention. As shown in FIG. 3C, the method of determining the estimated region of object 306 is used as an example. Compared to the actual object 306, a first estimated region 316a can be determined by employing the second reference signal strength ($RS_2$) as described in association with FIG. 2D. Since the second reference signal strength may be programmable, for a metal pipe, it can be programmed to provide the first estimated region 316a to be larger than the actual object 306, for example larger by 1 millimeter (mm), 3 mm, or other measurements on each side of the first estimated region based on design criteria for the scanner. By choosing the first estimated region 316a to be larger than the actual object 306, this approach can provide the benefit of having a higher level of confidence that a metal object is missed when the user drills into the opaque surface.

Additionally or optionally, a second estimated region 316b can be determined by inserting a safety margin. This safety margin is represented by the area between the first estimated region 316a and the second estimated region 316b. Various factors may be used to determine the safety margin, including but not limited to: 1) type of material of the opaque surface; 2) humidity of the environment; 3) temperature of the environment; or 4) other factors that may affect the accuracy of determining the estimated region of object 306. Depending on the application, either the first estimated region 316a or the second estimated region 316b may be used to represent the estimated region of object 306.

Figure 3D:
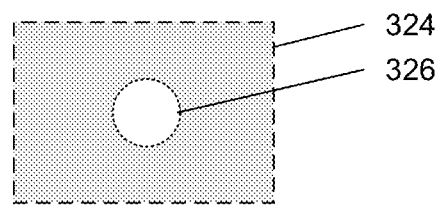
FIG. 3D illustrates an exemplary embodiment of displaying the estimated regions of the different objects of FIG. 3A according to aspects of the present invention.

FIG. 3D illustrates an exemplary implementation of displaying the estimated regions of the different objects of FIG. 3A according to aspects of the present invention. According to aspects of the present disclosure, a user interface can mean any form of communication to a user, including, but not limited to, visual (for example via a display or one or more light emitting diodes), audible (for example via a speaker) or sensory (for example via a vibration). The information being communicated may be displayed, streamed, stored, mapped, or distributed across multiple devices. Communication to the user can mean either the user or any other person or object which can receive communication. In one approach, when multiple objects are detected, the method determines regions where a single object is detected as well as regions where multiple objects are detected. In the example shown in FIG. 3D, metal pipe 326 may represent a region where multiple objects are detected (for example, which region includes part of stud 324), and rectangle 324 (which includes part of metal pipe 326) may represent a region where a part of it has multiple objects (for example, part of metal pipe 326 and part of stud 324) and another part of it (excluding the remainder of metal pipe 326 and the region that includes both stud 324 and metal pipe 326) has a single object.

Based on the above information, for the region of metal pipe 326, the display may be configured to display the multiple objects detected behind the opaque surface for this region. For the region of stud 324 that excludes metal pipe 326, the display may be configured to display the single object detected behind the opaque surface. In some implementations, for the region of metal pipe 326, depending on the types of objects detected, such as wood stud and metal pipe in this example, the display may be configured to display nothing for the region of metal pipe 326.

Figure 4A:
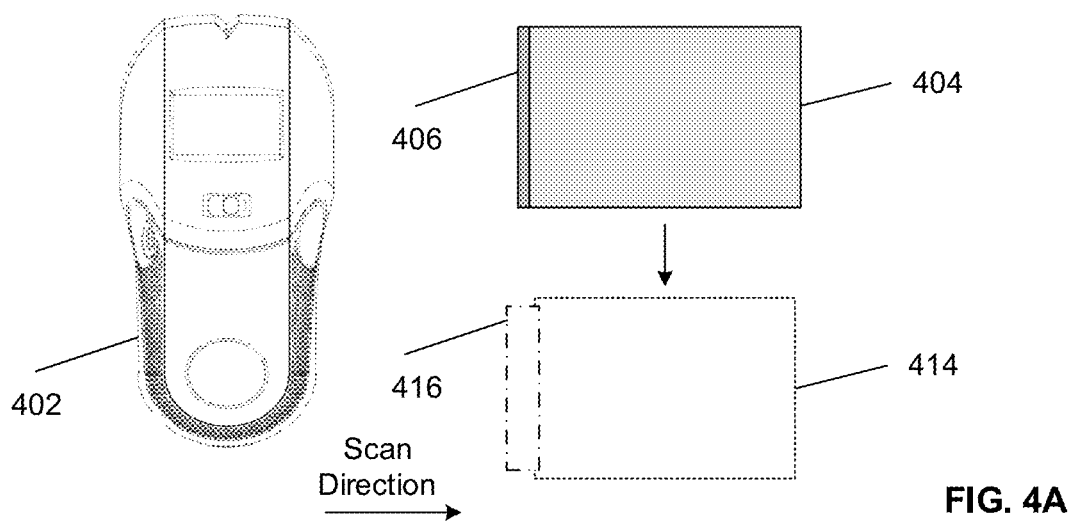
FIG. 4A illustrates a front view of yet another exemplary embodiment for differentiating one or more objects detected behind an opaque surface according to aspects of the present invention.

FIG. 4A illustrates a front view of yet another exemplary embodiment for differentiating one or more objects detected behind an opaque surface according to aspects of the present invention. As shown in FIG. 4A, the exemplary embodiment may include a scanner 402, and one or more objects (labelled as 404 and 406) behind an opaque surface. Note that the opaque surface is not shown for simplicity. Object 404 may be a wood stud, and object 406 may be an electrical wire. The scan direction may be from left to right. The method described above in association with FIG. 2A to FIG. 2D may be employed to determine an estimated region for each object behind the opaque surface, which is not repeated here. In this example, rectangle 414 represents an estimated region of object 404, and rectangle 416 represents an estimated region of object 406.

Figure 4B:
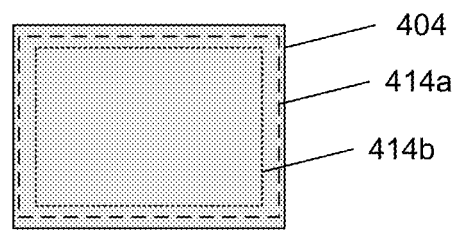
FIG. 4B illustrates an exemplary embodiment of determining an estimated region of an object of FIG. 4A according to aspects of the present invention.

FIG. 4B illustrates an exemplary method of determining an estimated region of an object of FIG. 4A according to aspects of the present invention. As shown in FIG. 4B, the method of determining the estimated region of object 404 is used as an example. Compared to the actual object 404, a first estimated region 414a can be determined by employing the first reference signal strength ($RS_1$) as described in association with FIG. 2C. Since the first reference signal strength may be programmable, for a wood stud, for example, it can be programmed to provide the first estimated region 414a to be smaller than the actual object 404, for example smaller by 2 mm, 4 mm, or other measurements on each side of the first estimated region based on design criteria for the scanner. By choosing the first estimated region 414a to be smaller than the actual object 404, this approach can provide the benefit of having a higher level of confidence that a wood stud is hit when a user drills into the opaque surface.

Additionally or optionally, a second estimated region 414b can be determined by inserting a safety margin. This safety margin is represented by the area between the first estimated region 414a and the second estimated region 414b. Various factors may be used to determine the safety margin, including but not limited to: 1) type of material of the opaque surface; 2) humidity of the environment; 3) temperature of the environment; or 4) other factors that may affect the accuracy of determining the estimated region of object 404. Depending on the application, either the first estimated region 414a or the second estimated region 414b may be used to represent the estimated region of object 404.

Figure 4C:
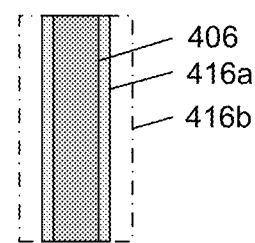
FIG. 4C illustrates another exemplary embodiment of determining an estimated region of another object of FIG. 4A according to aspects of the present invention.

FIG. 4C illustrates another exemplary method of determining an estimated region of another object of FIG. 4A according to aspects of the present invention. As shown in FIG. 4C, the method of determining the estimated region of object 406 is used as an example. Compared to the actual object 406, a first estimated region 416a can be determined by employing a third reference signal strength ($RS_3$) similar to the description in association with FIG. 2D. The third reference signal strength may be programmable. For example, for an electrical wire, it can be programmed to provide the first estimated region 416a to be larger than the actual object 406, for example larger by 3 mm, 5 mm, or other measurements on each side of the first estimated region based on design criteria for the scanner. By choosing the first estimated region 416a to be larger than the actual object 406, this approach can provide the benefit of having a higher level of confidence that an electrical wire is missed when a user drills into the opaque surface.

Additionally or optionally, a second estimated region 416b can be determined by inserting a safety margin. This safety margin is represented by the area between the first estimated region 416a and the second estimated region 416b. Various factors may be used to determine the safety margin, including but not limited to: 1) type of material of the opaque surface; 2) humidity of the environment; 3) temperature of the environment; or 4) other factors that may affect the accuracy of determining the estimated region of object 406. The safety margin may add 1 mm, 3 mm, or other measurements on each side of the first estimated region to form the second estimated region based on the above factors and the design criteria for the scanner. Depending on the application, either the first estimated region 416a or the second estimated region 416b may be used to represent the estimated region of object 406.

Figure 4D:
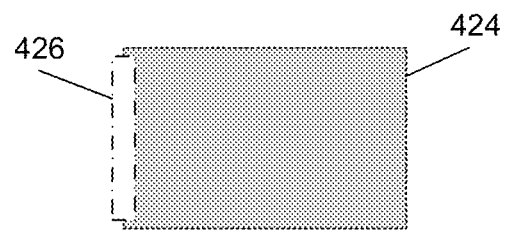
FIG. 4D illustrates an exemplary embodiment of displaying the estimated regions of the different objects of FIG. 4A according to aspects of the present invention.

FIG. 4D illustrates an exemplary implementation of displaying the estimated regions of the different objects of FIG. 4A according to aspects of the present invention. In one approach, when multiple objects are detected, the method determines regions where a single object is detected as well as regions where multiple objects are detected. In the example shown in FIG. 4D, rectangle 426 may represent a region where multiple objects are detected, and rectangle 424 (which includes part of rectangle 426) may represent a region where a part of it has multiple objects (for example the region that overlaps with rectangle 426) and another part of it (excluding the region that overlaps with rectangle 426) has a single object.

Based on the above information, for the region of the rectangle 426, the display may be configured to display the multiple objects detected behind the opaque surface for this region. For the region of the rectangle 424 that excludes the rectangle 426, the display may be configured to display the single object detected behind the opaque surface. In some implementations, for the region of the rectangle 426, depending on the types of objects detected, such as wood stud and electrical wire in this example, the display may be configured to display nothing for the region of the rectangle 426.

Figure 5A:
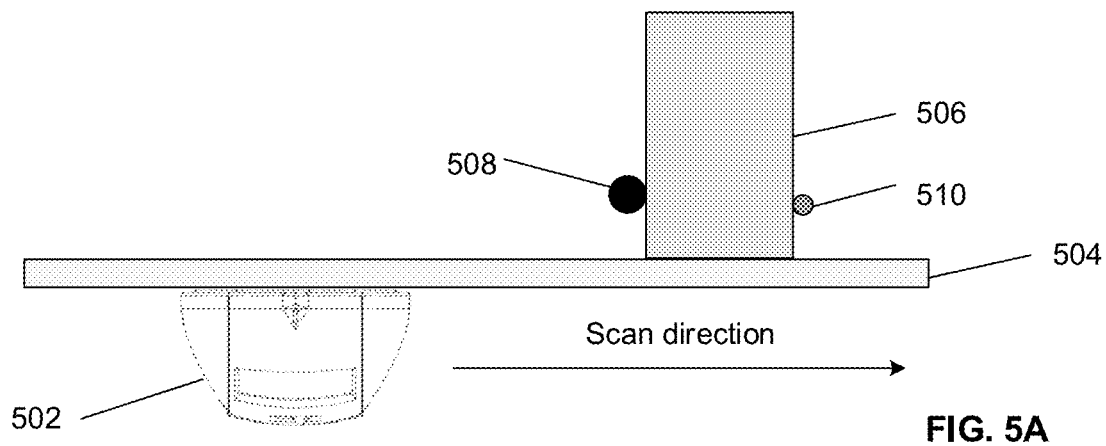
FIG. 5A illustrates a top view of yet another exemplary embodiment for differentiating one or more objects detected behind an opaque surface according to aspects of the present invention.

FIG. 5A illustrates a top view of yet another exemplary embodiment for differentiating one or more objects detected behind an opaque surface according to aspects of the present invention. As shown in FIG. 5A, the exemplary embodiment may include a scanner 502, an opaque surface 504, and one or more objects (labelled as 506, 508, and 510) behind the opaque surface 504. The scanner 502 may be configured to detect a variety of objects behind the opaque surface, including but not limited to: 1) wood studs; 2) metallic objects; 3) electrical wires; or 4) other objects. In the example of FIG. 5A, object 506 may be a wood stud, object 508 may be a metal pipe, and object 510 may be an electrical wire.

Figure 5B:
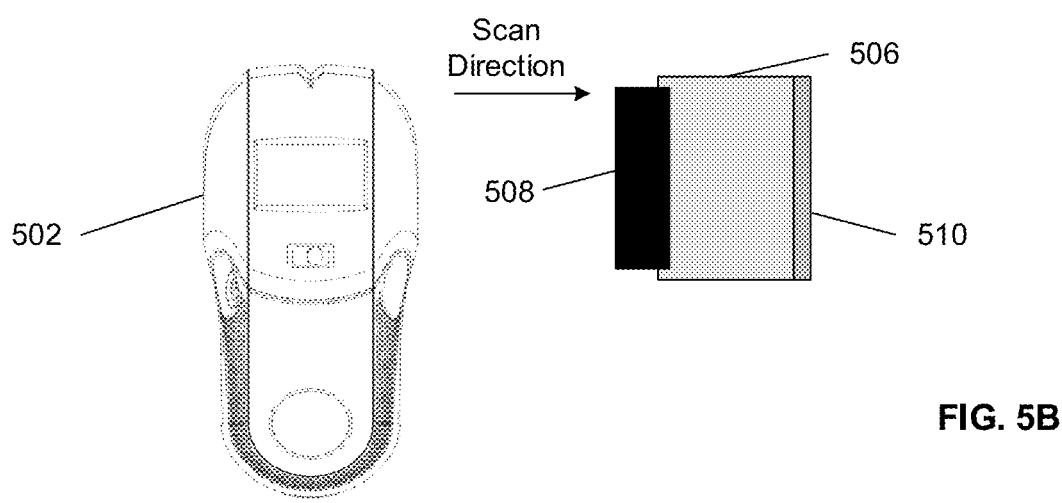
FIG. 5B illustrates a front view of the exemplary embodiment of FIG. 5A for differentiating one or more objects detected behind an opaque surface according to aspects of the present invention.

FIG. 5B illustrates a front view of the exemplary embodiment of FIG. 5A for detecting object(s) behind an opaque surface according to aspects of the present invention. In the example of FIG. 5B, the opaque surface is not shown for simplicity. As shown in FIG. 5A and FIG. 5B, the scan direction may be from right to left. A person skilled in the art would understand that the scan direction may be adjusted based on the working environment, the preference of the user, and the specific application. In other words, the scan direction may be from left to right, right to left, up to down, down to up, or diagonally. In some applications, a user may perform multiple scans and/or from multiple directions to improve the accuracy of sensor data collected.

Figure 5C:
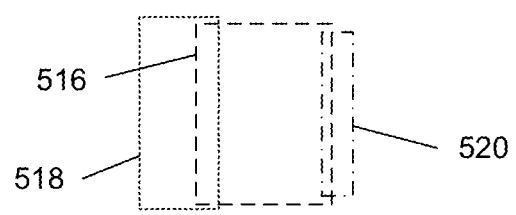
FIG. 5C illustrates estimated exemplary regions of the different objects of FIG. 5B according to aspects of the present invention.

FIG. 5C illustrates estimated regions of the different objects of FIG. 5B according to aspects of the present invention. Note that the method of determining an estimated region of an object is described above, for example in association with FIG. 3B and FIG. 3C, which is not repeated here. As shown in FIG. 5C, rectangle 516 represents an estimated region for stud 506, rectangle 518 represents an estimated region for metal pipe 508, and rectangle 520 represents an estimated region for electrical wire 510.

In this particular example, since the object 506 is a wood stud, the estimated region 516 can be configured to be smaller than stud 506, this approach can provide the benefit of having a higher level of confidence that a wood stud 506 is penetrated by a drill bit when a user drills through the opaque surface. Since the object 508 is a metal pipe, the estimated region 518 can be configured to be larger than metal pipe 508, this approach can provide the benefit of having a higher level of confidence that metal pipe 508 is missed when a user drills through the opaque surface. Similarly, since the object 510 is an electrical wire, the estimated region 520 can be configured to be larger than electrical wire 510, this approach can provide the benefit of having a higher level of confidence that electrical wire 510 is missed when a user drills through the opaque surface.

Figure 5D:
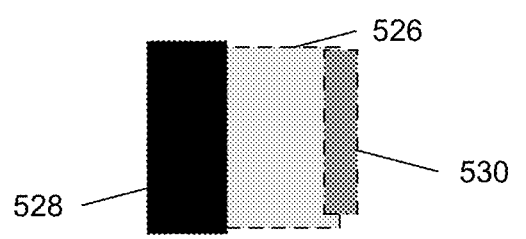
FIG. 5D illustrates an exemplary embodiment of displaying the estimated regions of the different objects of FIG. 5C according to aspects of the present invention.

FIG. 5D illustrates an exemplary implementation of displaying the estimated regions of the different objects of FIG. 5C according to aspects of the present invention. With the estimated region 516 being configured to be smaller than stud 506 while the estimated region 518 being configured to be larger than metal pipe 508, and the estimated region 520 being configured to be larger than electrical wire 510. In some implementations, the display may be configured to display the estimated region for stud 506, represented by rectangle 526, and display the estimated region for metal pipe 508, represented by rectangle 528, and display the estimated region for electrical wire 510, represented by the rectangle 530. In some other implementations, the display may be configured to display the region under the rectangle 528 to include both metal pipe 508 and wood stud 506, and display the region under the rectangle 530 to include both electrical wire 510 and wood stud 506.

Figure 6A:
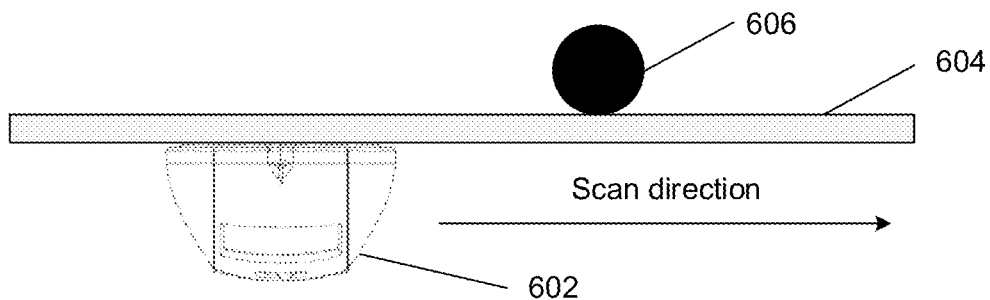
FIG. 6A illustrates a top view of an exemplary embodiment for differentiating one or more objects detected behind an opaque surface using sensor data from different sensors according to aspects of the present invention.

FIG. 6A illustrates a top view of an exemplary embodiment for differentiating one or more objects detected behind an opaque surface using sensor data from different sensors according to aspects of the present invention. In the example shown in FIG. 6A, the exemplary embodiment may include a scanner 602, an opaque surface 604, and one or more objects (labelled as 606) behind the opaque surface 604. In the example of FIG. 6A, object 606 may be, for example, a metal pipe.

Figure 6B:
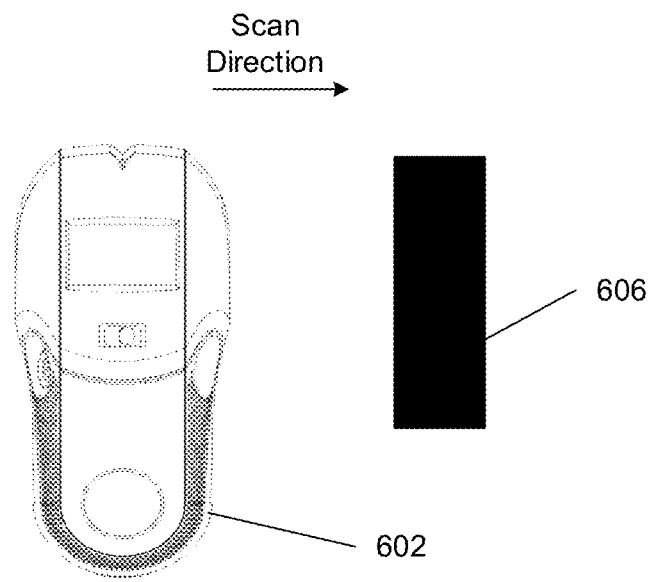
FIG. 6B illustrates a front view of the exemplary embodiment of FIG. 6A for differentiating the detected object according to aspects of the present invention.

FIG. 6B illustrates a front view of the exemplary embodiment of FIG. 6A for detecting the object according to aspects of the present invention. In the example of FIG. 6B, the opaque surface is not shown for simplicity. As shown in FIG. 6A and FIG. 6B, the scan direction may be from left to right. A person skilled in the art would understand that the scan direction may be adjusted based on the working environment, the preference of the user, and the specific application. In other words, the scan direction may be from left to right, right to left, up to down, down to up, or diagonally. In some applications, a user may perform multiple scans and/or from multiple directions to improve the accuracy of sensor data collected.

Figure 6C:
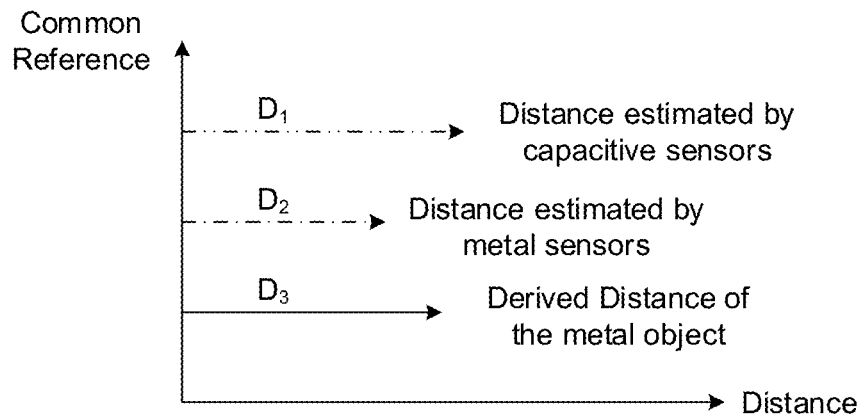
FIG. 6C illustrates an exemplary embodiment of determining a distance between the scanner and the object of FIG. 6B according to aspects of the present invention.

FIG. 6C illustrates an exemplary method of determining a distance between the scanner and the object of FIG. 6B according to aspects of the present invention. As shown in FIG. 6C, the vertical axis represents a common reference point or a common reference line from which a distance between scanner 602 and metal pipe 606 is estimated. The horizontal axis represents a distance from the common reference point or the common reference line. Scanner 602 may be configured to collect sensor data as described above in association with FIG. 2C and FIG. 2D. For example, based on the sensor data collected by one or more capacitive sensors of scanner 602, a first distance $D_1$, representing a distance between scanner 602 and metal pipe 606, may be estimated by the capacitive sensors.

In addition, based on the sensor data collected by one or more metal sensors of scanner 602, a second distance $D_2$, representing a distance between scanner 602 and metal pipe 606, may be estimated by the metal sensors. Note that although it is the same object (metal pipe 606) behind opaque surface 604, the capacitive sensors and the metal sensors may provide different estimations with respect to the distance between scanner 602 and metal pipe 606. In this exemplary embodiment, due to the presence of a large amount of metal, the metal sensors may provide an estimated distance (e.g. $D_2$) that is shorter than the actual distance between scanner 602 and metal pipe 606. On the other hand, the capacitive sensors may provide an estimated distance (e.g. $D_1$) that is closer to the actual distance between scanner 602 and the metal pipe 606.

From both the sensor data collected by the capacitive sensors (not shown) and the sensor data collected by the metal sensors (not shown), scanner 602 may be configured to derive a distance $D_3$ for metal pipe 606 from the common reference. Thus, by using the sensor data collected by the capacitive sensors and the sensor data collected by the metal sensors, scanner 602 will obtain an improved estimation of the distance between scanner 602 and metal pipe 606 in this example. According to aspects of the present invention, both the sensor data collected by the capacitive sensors and the metal sensors may be collected in parallel in a one-pass scan, or multiple sets of sensor data may be collected by the capacitive sensors and the metal sensors in parallel with multiple passes, respectively.

Figure 7A:
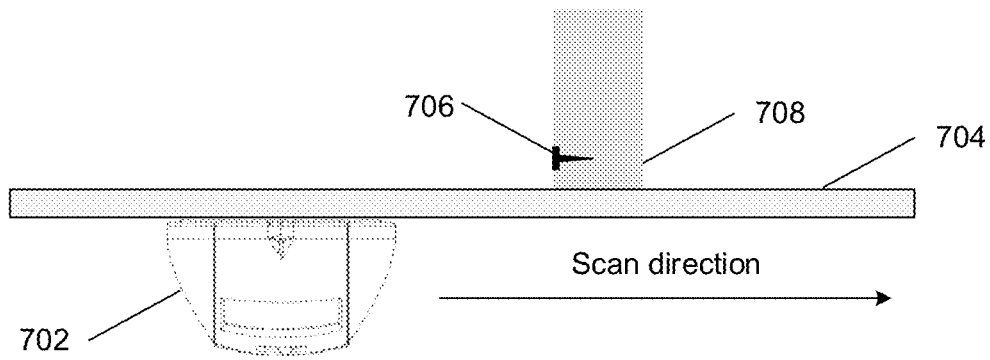
FIG. 7A illustrates a top view of an exemplary embodiment for detecting a metal object behind an opaque surface using sensor data from different sensors according to aspects of the present invention.

FIG. 7A illustrates a top view of an exemplary embodiment for differentiating object(s), here a metal screw 706 and stud 708, detected behind an opaque surface using sensor data from different sensors according to aspects of the present invention. As shown in FIG. 7A, the exemplary embodiment may include a scanner 702, an opaque surface 704, and one or more objects (labelled as 706 (metal screw) and 708 (stud)) behind opaque surface 704. In FIG. 7A, for example, object 706 may be a metal screw and for example, object 708 may be a wood stud.

Figure 7B:
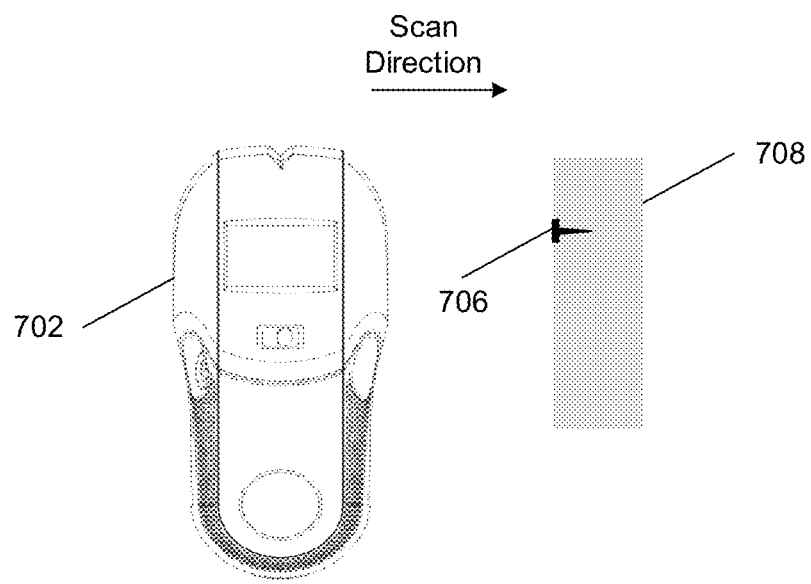
FIG. 7B illustrates a front view of the exemplary embodiment of FIG. 7A for detecting the metal object according to aspects of the present invention.

FIG. 7B illustrates a front view of the exemplary embodiment of FIG. 7A for detecting the metal object according to aspects of the present invention. As shown in FIG. 7A and FIG. 7B, the scan direction may be from left to right. A person skilled in the art would understand that the scan direction may be adjusted based on the working environment, the preference of the user, and the specific application. In other words, the scan direction may be from left to right, right to left, up to down, down to up, or diagonally. In some applications, a user may perform multiple scans and/or from multiple directions to improve the accuracy of sensor data collected.

Figure 7C:
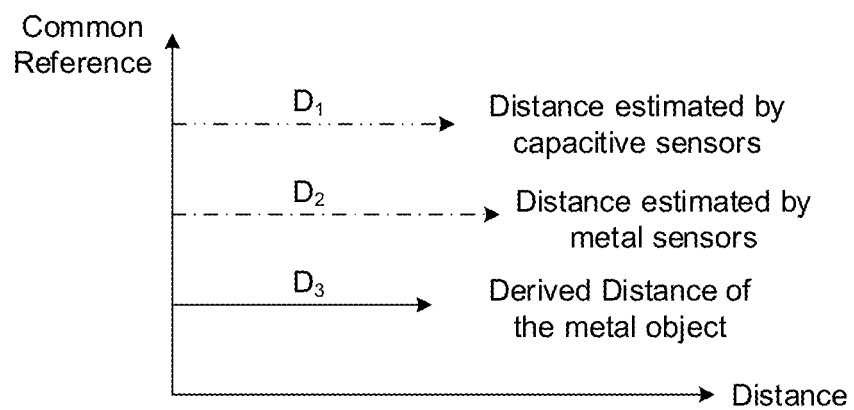
FIG. 7C illustrates an exemplary method of determining a distance between the scanner and the metal object of FIG. 7B according to aspects of the present invention.

FIG. 7C illustrates an exemplary method of determining a distance between the scanner and the metal object of FIG. 7B (screw 706) according to aspects of the present invention. As shown in FIG. 7C, the vertical axis represents a common reference point or a common reference line from which a distance between scanner 702 and metal screw 706 and stud 708 is estimated. The horizontal axis represents a distance from the common reference point or the common reference line. Scanner 702 may be configured to collect sensor data as described above in association with FIG. 2C and FIG. 2D. For example, based on the sensor data collected by one or more capacitive sensors of scanner 702, a first distance $D_1$, representing a distance between scanner 702 and metal screw 706 and stud 708 may be estimated by the capacitive sensors.

In addition, based on the sensor data collected by one or more metal sensors of scanner 702, a second distance $D_2$, representing a distance between scanner 702 and metal screw 706, may be estimated by the metal sensors. Note that the capacitive sensors and the metal sensors may provide different estimations with respect to the distance between scanner 702 and metal screw 706 based upon the relative size of the metal screw. In this exemplary embodiment, due to the presence of metal, the metal sensors may provide an estimated distance (e.g. $D_2$) that is different from the actual distance between scanner 702 and metal screw 706. On the other hand, the capacitive sensors may provide an estimated distance (e.g. $D_1$) that may be closer to the actual distance between scanner 702 and metal screw 706.

From both the sensor data collected by the capacitive sensors and the sensor data collected by the metal sensors, scanner 702 may be configured to derive a distance $D_3$ for metal screw 706. Thus, by using the sensor data collected by the capacitive sensors and the sensor data collected by the metal sensors, scanner 702 may be able to obtain an improved estimation of the distance between scanner 702 and metal screw 706 in this example. According to aspects of the present invention, both the sensor data collected by the capacitive sensors and the metal sensors may be collected in parallel in a one-pass scan, or multiple sets of sensor data may be collected by the capacitive sensors and the metal sensors in parallel with multiple passes, respectively.

Figure 8:
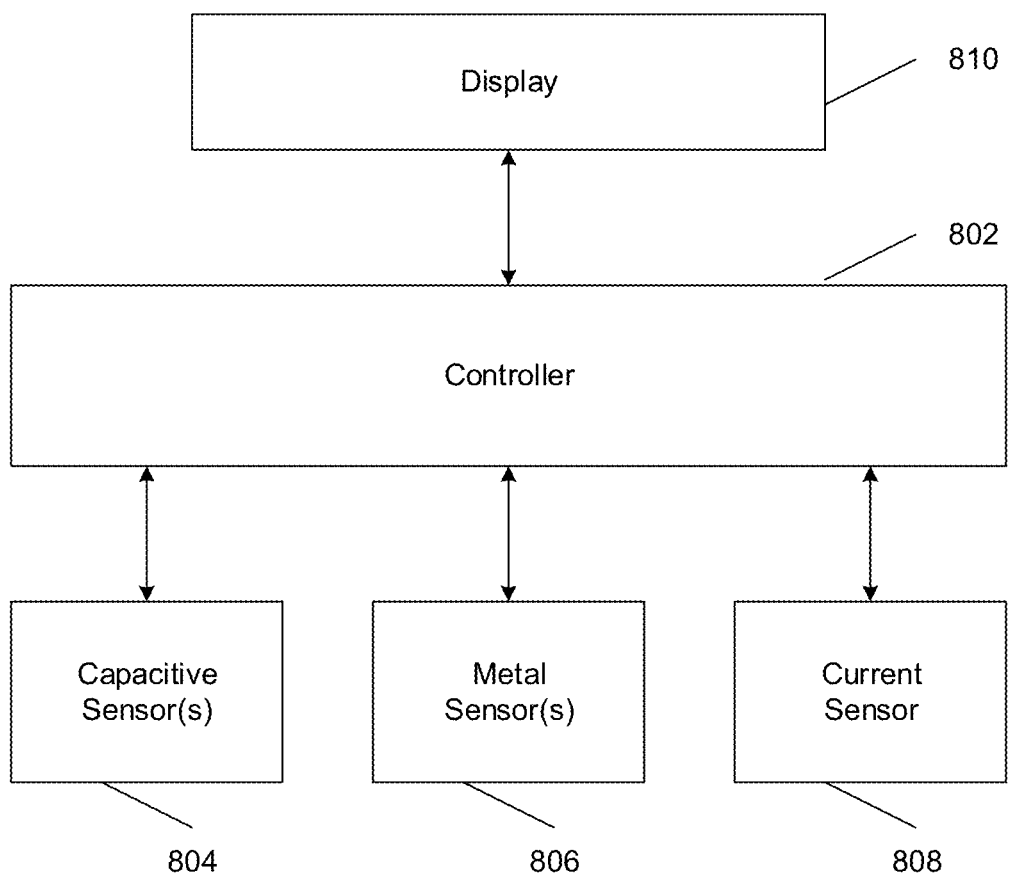
FIG. 8 illustrates a block diagram of an exemplary embodiment of a system for differentiating one or more objects detected behind an opaque surface using sensor data from different sensors according to aspects of the present invention.

FIG. 8 illustrates a block diagram of an exemplary embodiment of a system for differentiating one or more objects detected behind an opaque surface using sensor data from different sensors according to aspects of the present invention. In the exemplary system shown in FIG. 8, a controller 802 may be configured to process sensor data collected by sensors of the scanner, namely sensor data collected by capacitive sensors 804, metal sensor 806, and current sensor 808. The controller is further configured to determine information about the detected objects behind the opaque surface based on the sensor data collected by capacitive sensors 804, metal sensor 806, and/or current sensor 808 in parallel. The controller may include one or more processors. A display 810 is configured to provide information about the detected objects to a user.

According to aspects of the disclosure, the functional blocks described in the system of FIG. 8 may be implemented in an integrated device such as scanner 202 of FIG. 2A. In other implementations, the capacitive sensors 804, metal sensors 806, and current sensor 808 may reside in one device, while the controller 802 and the display 810 may reside in another device. For example, a scanner device may include the sensors, and the sensor data collected by the scanner device may be wirelessly communicated to a second device. The second device, for example a smartphone, a tablet, or a laptop, may include the controller 802 and the display 810. In yet other implementations, the controller 802, the capacitive sensors 804, metal sensors 806, and current sensor 808, may reside in one device, while the display 810 may reside in another device. For example, a scanner device may include the controller 802 and the sensors, and the sensor data collected by the scanner device may be wirelessly communicated to a second device. The second device, for example a monitor, may be configured to receive and display the sensor data.

According to aspects of the present disclosure, examples of capacitive sensors and methods of operating the same are described in U.S. Pat. No. 5,619,128, entitled "STUD SENSOR WITH OVER-STUD MISCALIBRATION VIA CIRCUIT WHICH STORES AN INITIAL CALIBRATION DENSITY, COMPARES THAT TO A CURRENT TEST DENSITY AND OUTPUTS RESULT VIA INDICATOR," which is incorporated herein in its entirety by reference. Examples of metal sensors and methods of operating the same are described in U.S. Pat. No. 7,812,722, entitled "DUAL ORIENTATION METAL SCANNER," which is incorporated herein in its entirety by reference. Examples of current sensors and methods of operating the same are described in U.S. Pat. No. 6,933,712, entitled "ELECTRICAL CIRCUIT TRACING AND IDENTIFYING APPARATUS AND METHOD," which is incorporated herein in its entirety by reference. In one exemplary embodiment, current sensors may be alternating current sensors. In another exemplary embodiment, current sensors may be able to detect the static magnetic field of or associated with direct current.

Figure 9A:
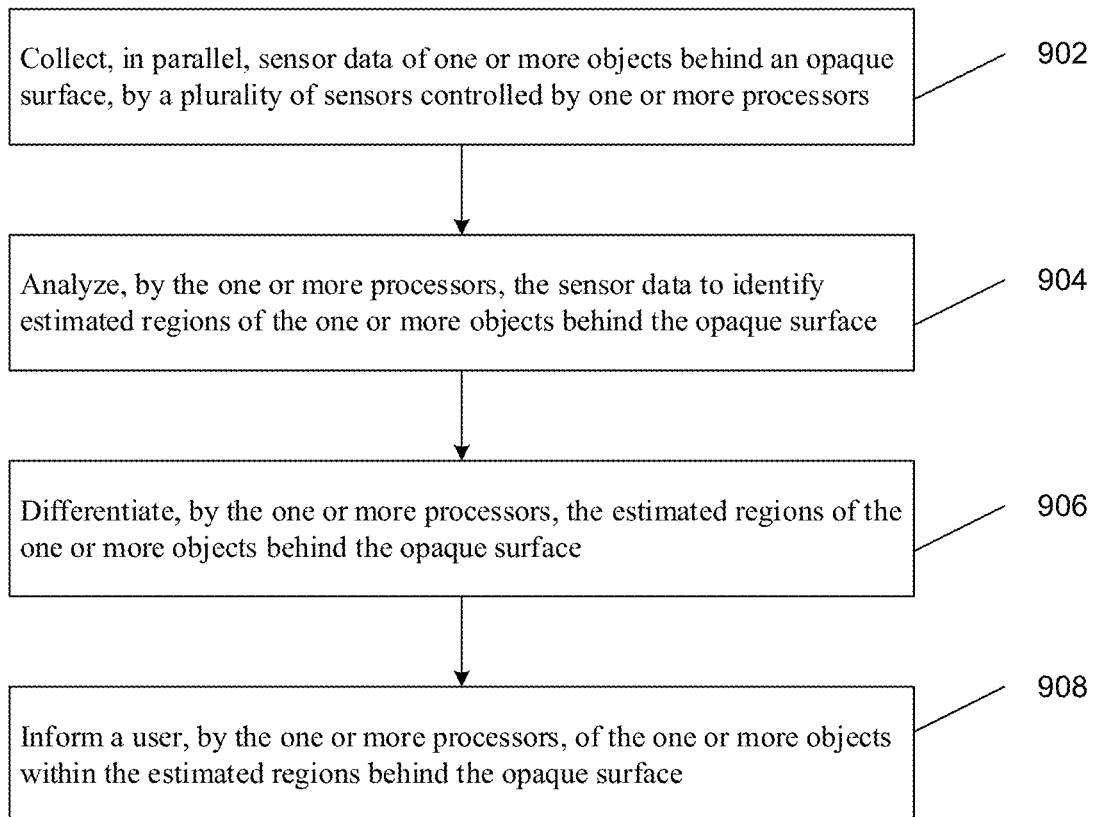
FIG. 9A illustrates a method of differentiating one or more objects detected behind an opaque surface using sensor data from different sensors according to aspects of the present invention.

FIG. 9A illustrates a method of differentiating one or more objects detected behind an opaque surface using sensor data from different sensors according to aspects of the present invention. As shown in FIG. 9A, in block 902, the method collects, in parallel, sensor data of the one or more objects behind an opaque surface, by a plurality of sensors controlled by one or more processors. In block 904, the method analyzes, by the one or more processors, the sensor data to identify estimated regions of the one or more objects behind the opaque surface. In block 906, the method differentiates, by the one or more processors, the estimated regions of the one or more objects behind the opaque surface. In block 908, the method informs a user, by the one or more processors, of the one or more objects within the estimated regions behind the opaque surface.

According to aspects of the present disclosure, the plurality of sensors may include at least a first set of sensors configured to detect a first type of material and a second set of sensors configured to detect a second type of material; and the estimated regions include a first estimated region of the first type of material and a second estimated region of the second type of material. The first set of sensors may include one or more capacitive sensors and the first type of material include wood studs; and the second set of sensors may include one or more metal sensors and the second type of material include metal objects. The plurality of sensors may further include a third set of sensors configured to detect a third type of material; where the third set of sensors includes one or more current sensors and the third type of material include electrical wires. According to aspects of the present disclosure, a set of sensors may include one or more sensors in the set.

The method of collecting sensor data includes mapping the sensor data of the one or more objects behind the opaque surface with respect to a common reference point. The method of differentiating the estimated regions of the one or more objects behind the opaque surface includes determining an overlap region between the first estimated region and the second estimated region.

Figure 9B:
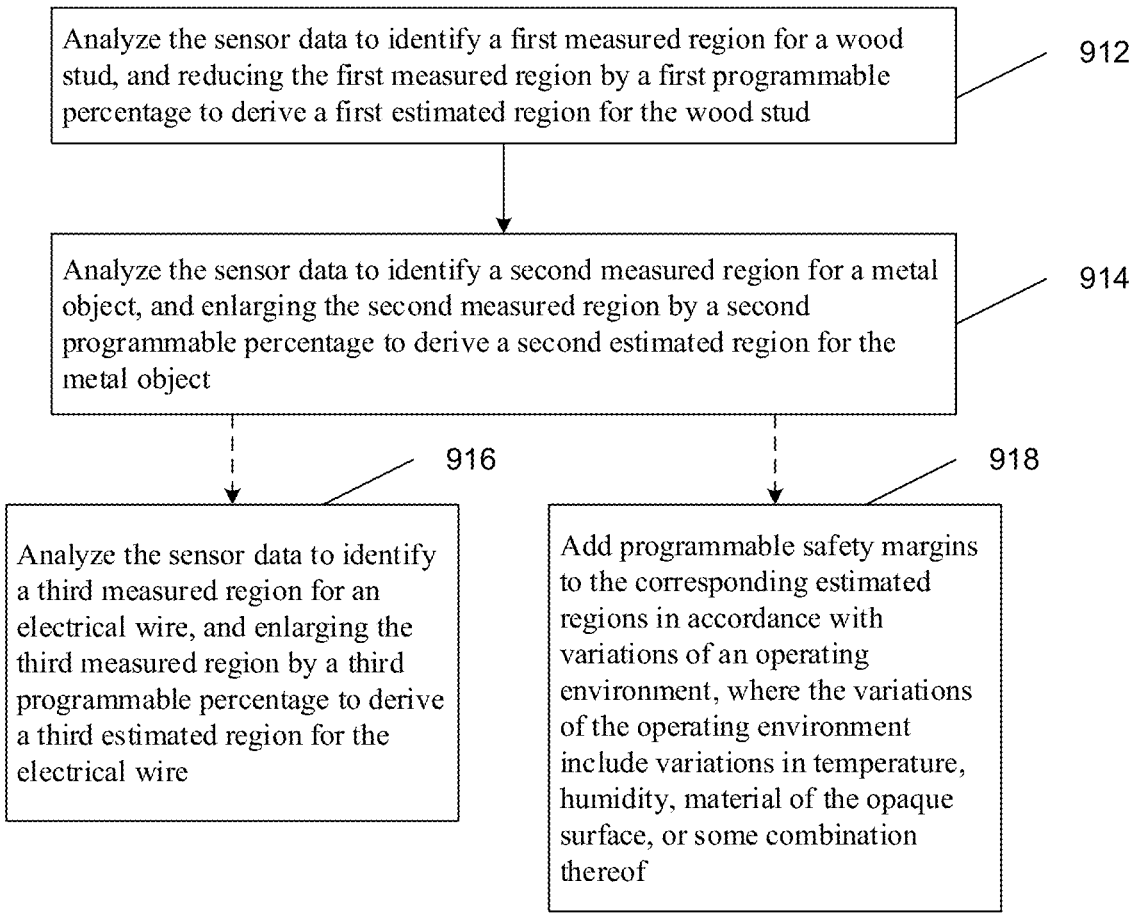
FIG. 9B illustrates a method of analyzing sensor data to identify estimated regions of the objects detected behind an opaque surface according to aspects of the present invention.

FIG. 9B illustrates a method of analyzing sensor data to identify estimated regions of the objects detected behind an opaque surface according to aspects of the present invention. In the exemplary embodiment of FIG. 9B, in block 912, the method analyzes the sensor data to identify a first measured region for a wood stud, and reduces the first measured region by a first programmable percentage to derive a first estimated region for the wood stud. In block 914, the method analyzes the sensor data to identify a second measured region for a metal object, and enlarging the second measured region by a second programmable percentage to derive a second estimated region for the metal object.

According to aspects of the present disclosure, the methods performed in block 912 and block 914 may additionally or optionally include the methods performed in block 916 and/or block 918. In block 916, the method analyzes the sensor data to identify a third measured region for an electrical wire, and enlarging the third measured region by a third programmable percentage to derive a third estimated region for the electrical wire. In block 918, the method adds programmable safety margins to the corresponding estimated regions in accordance with variations of an operating environment, where the variations of the operating environment include variations in temperature, humidity, material of the opaque surface, or some combination thereof.

Figure 9C:
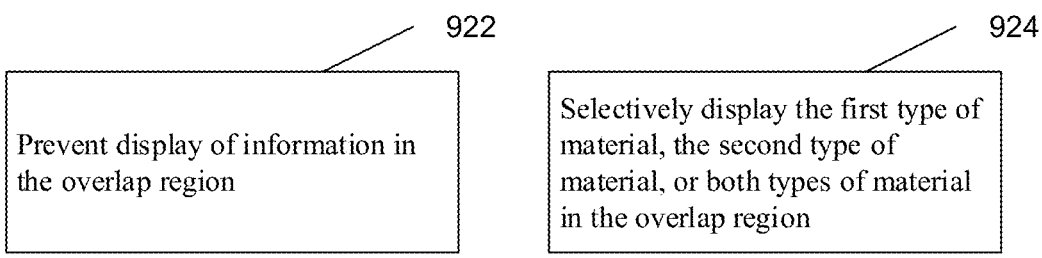
FIG. 9C illustrates a method of informing a user of the objects detected behind an opaque surface according to aspects of the present invention.

FIG. 9C illustrates a method of informing a user of the objects detected behind an opaque surface according to aspects of the present invention. In the example shown in FIG. 9C, the method described in either block 922 or block 924 may be performed. In block 922, the method prevents display of information in the overlap region. In block 924, the method selectively displays the first type of material, the second type of material, or both types of material in the overlap region.

Figure 10A:
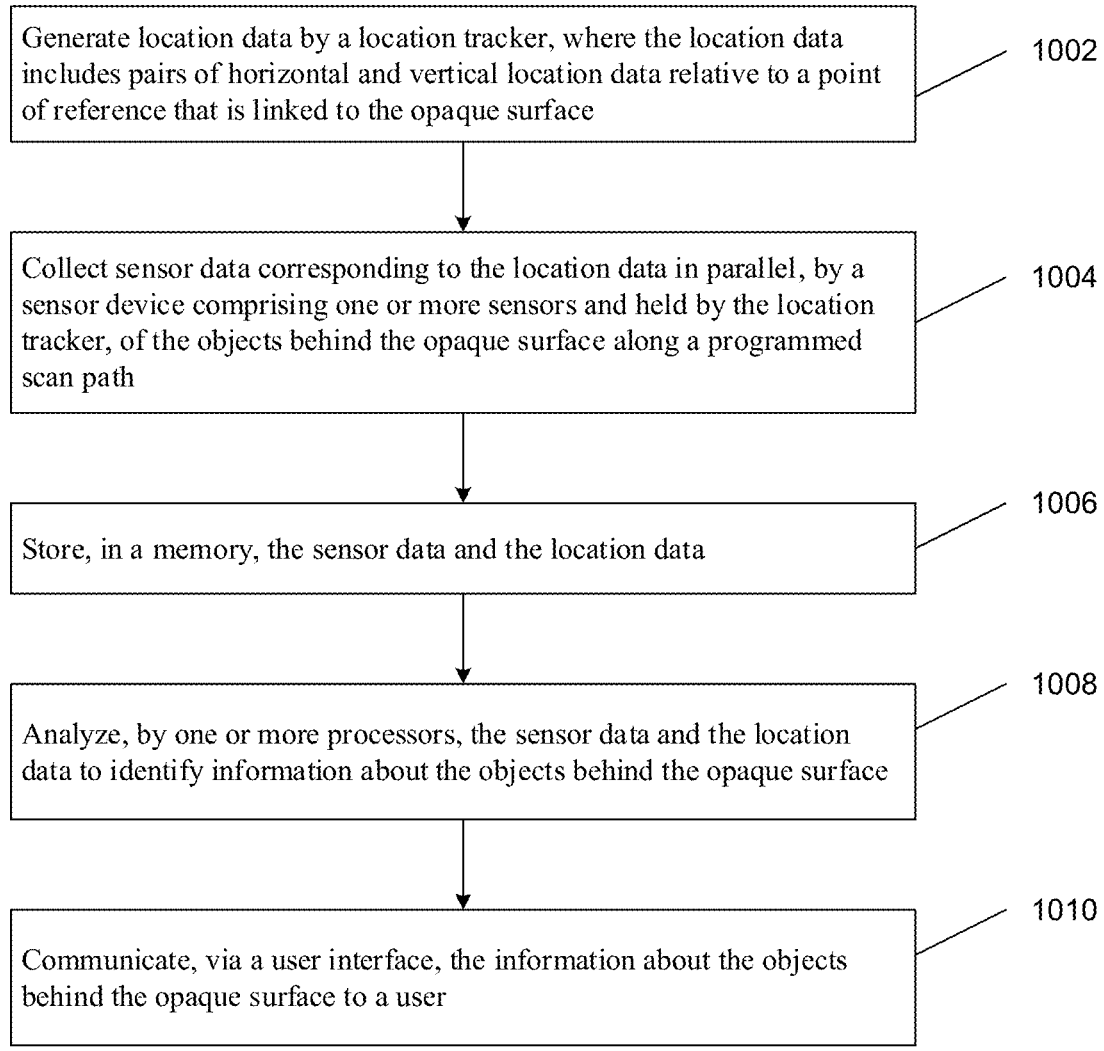
FIG. 10A illustrates a method of mapping objects behind an opaque surface according to aspects of the present disclosure.

FIG. 10A illustrates a method of mapping objects behind an opaque surface according to aspects of the present disclosure. As shown in FIG. 10A, in block 1002, the method generates location data by a location tracker, where the location data includes pairs of horizontal and vertical location data relative to a point of reference that is linked to the opaque surface. In block 1004, the method collects sensor data corresponding to the location data in parallel, by a sensor device comprising one or more sensors and held by the location tracker, of the objects behind the opaque surface along a programmed scan path. In block 1006, the method stores, in a memory, the sensor data and the location data. In block 1008, the method analyzes, by one or more processors, the sensor data and the location data to identify information about the objects behind the opaque surface. In block 1010, the method communicates, via a user interface, the information about the objects behind the opaque surface to a user.

According to aspects of the present disclosure, mapping of a large area of an opaque surface, such as a wall, can be beneficial in many construction or architectural scenarios. For example, the method can be employed including but not limited to 1) find a stud to hang heavy objects safely and securely; 2) identify plumbing or electrical objects to avoid potential hazards when cutting or drilling into the opaque surface; 3) locate structures like plumbing and electrical for modification or upgrades; 4) perform forensic determination of compliance with building codes; 5) perform remodeling or inspection of legacy infrastructure, where detailed drawings are either inaccurate or do not exist; and etc.

Figure 10B:
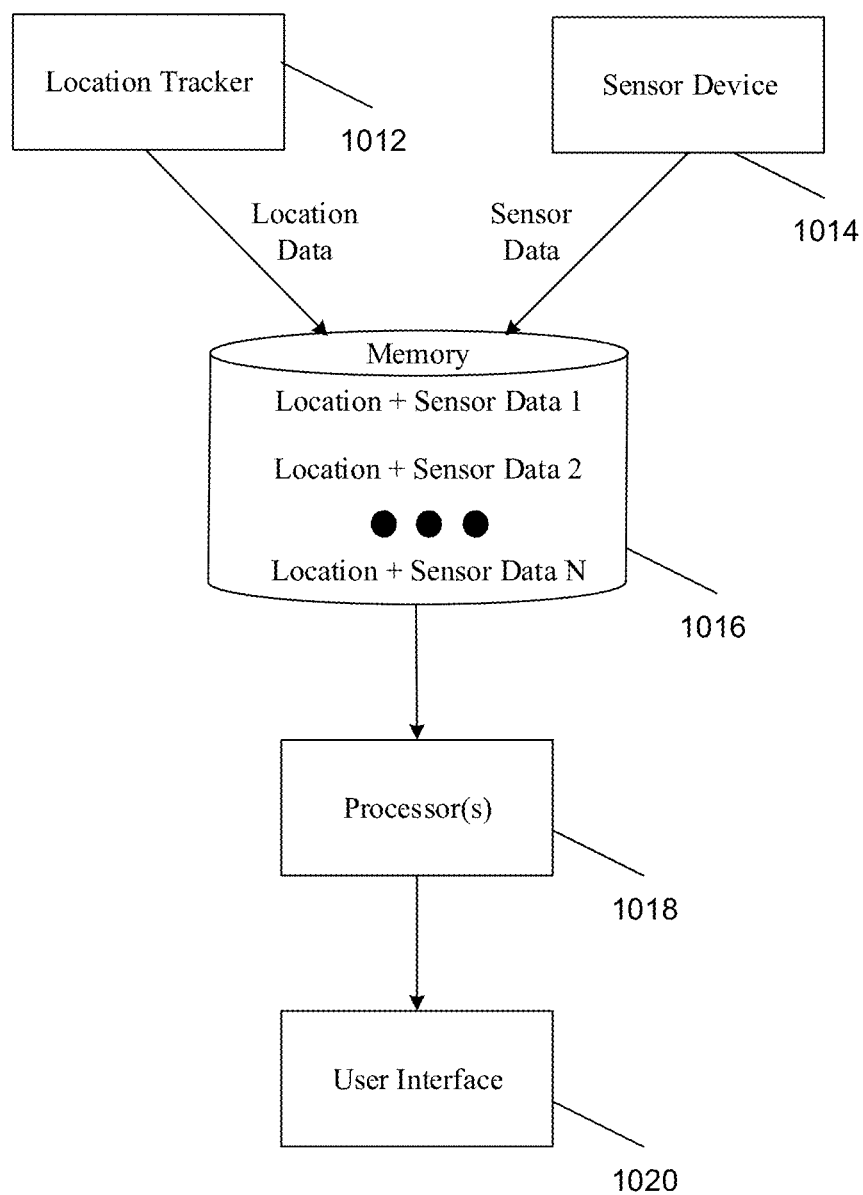
FIG. 10B illustrates an exemplary apparatus for mapping objects behind an opaque surface according to aspects of the present disclosure.

FIG. 10B illustrates an exemplary apparatus for mapping objects behind an opaque surface according to aspects of the present disclosure. As shown in the exemplary apparatus of FIG. 10B, the apparatus includes location tracker 1012, sensor device 1014, memory 1016, one or more processors 1018, and user interface 1020. According to aspects of the present disclosure, the location data (from location tracker 1012) and sensor data (from sensor device 1014) are collected in synchronization. Each corresponding pair of location data and sensor data are stored in the memory 1016. The sensor device 1014 may include one or more capacitive sensors, one or more metal sensors, one or more current sensors, or other types of sensors. The sensor data may include at least one of: sensor data collected by one or more capacitive sensors; sensor data collected by one or more metal sensors; sensor data collected by one or more current sensors, or a combination thereof. The one or more processors 1018 can be configured to control the location tracker 1012, the sensor device 1014, the memory 1016, and the user interface 1020.

Note that the method of mapping can be configured to create a plot over a defined area that delineates the type and location of various hidden objects/structures behind an opaque surface. The map can be recalled for future use, thus obviating the need to spend additional time scanning. In addition, some benefits of the mapping method can include accurately determining size of objects; accurately determining shape of objects; and accurately determining location of objects behind the opaque surface. Yet another benefit of the mapping method is that it can provide sensory data with a physical location and context. This allows a user to view subsurface structures in their entirety, which in turn improves the reliability of interpretation of sensor data within the structure, by giving the user the ability to view the entire scan area and locations of objects on a display.

Figure 10C:
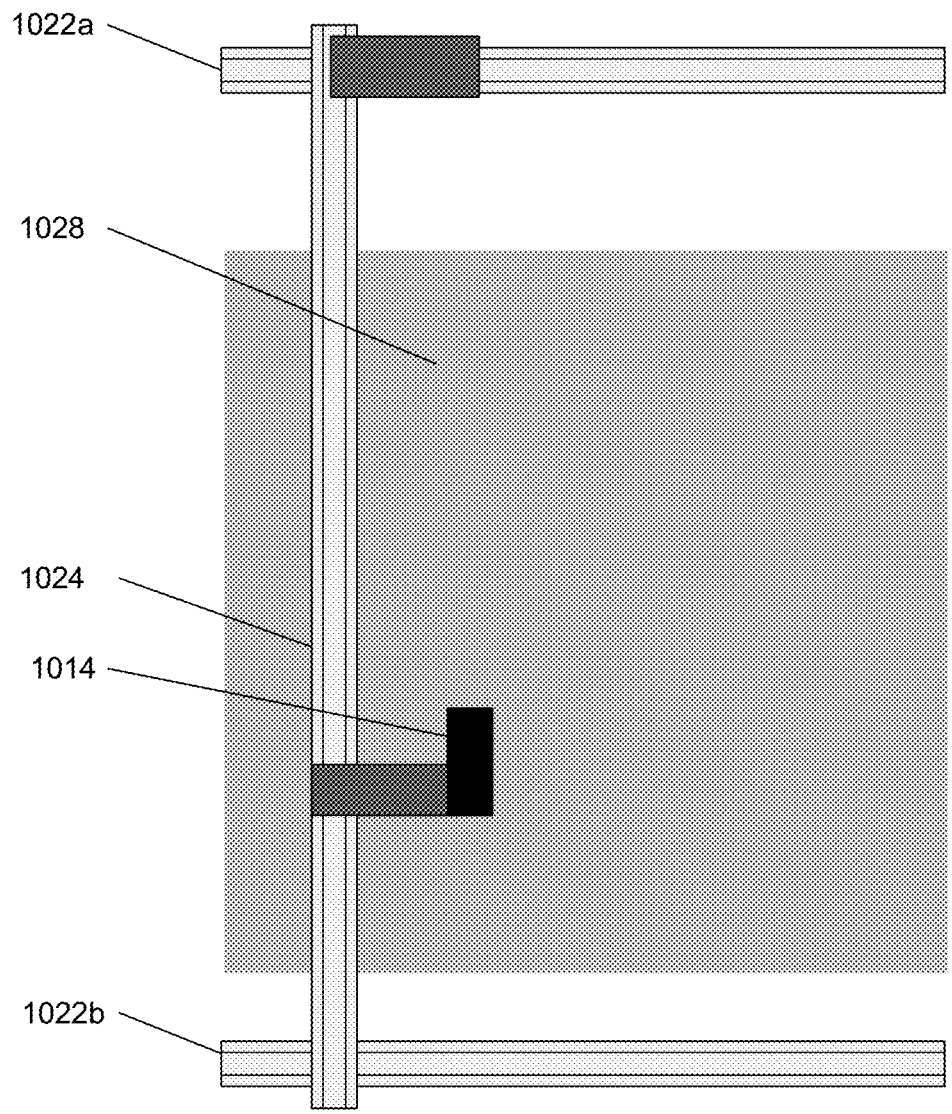
FIG. 10C illustrates an exemplary location tracker and sensor device used for mapping objects behind an opaque surface according to aspects of the present disclosure.

FIG. 10C illustrates an exemplary location tracker and sensor device used for mapping objects behind an opaque surface according to aspects of the present disclosure. The location tracker 1012 is configured to hold the sensor device 1014. The location tracker 1012 is configured to scan an area of an opaque surface 1028 with respect to a reference point (not shown) one time, or to scan the area of the opaque surface 1028 a predetermined number of times. In the example of FIG. 10C, the location tracker 1012 of FIG. 10B may include a first arm 1022*a* configured to control movements of the sensor device 1014 in a horizontal direction and a second arm 1024 configured to control movements of the sensor device 1014 in a vertical direction. The location tracker 1012 of FIG. 10B may additionally or optionally include a third arm 1022*b* that is positioned in parallel with the first arm 1022*a* and is configured to control movements of the sensor device 1014 in a horizontal direction in conjunction with the first arm 1022*a*. FIG. 10C shows the first arm 1022*a* and the third arm 1022*b* positioned horizontally and the second arm 1024 positioned vertically with respect to the opaque surface 1028. In another implementation, the first arm and the third arm may be positioned vertically and the second arm may be positioned horizontally with respect to the opaque surface 1028. In yet another implementation, the first arm and the second arm may be joined by a hinge and function like a robot arm; neither the first arm nor the second arm need to be positioned horizontally or vertically with respect to the opaque surface 1028. In some applications, the scan may be performed repetitive or different scan patterns relative to the reference point to increase accuracy and to remove outliers. Note that this approach is advantageous over manual operation of a scan device, because a manual operated scan device can not accurately track the location of the sensors relative to a reference point. In addition, a manual operated scan device cannot accurately perform repetitive scans and accumulate results of different scan paths within the scan area, because a manual operated scan device does not have a pre-programmed scan pattern relative to the reference point.

According to aspects of the present disclosure, streams of sensor data can be combined with corresponding location data to create an image of the hidden objects/structures beneath a defined scan area of the opaque surface. Location data and sensor data can be stored and used for subsequent retrieval and analysis, which in turn can reduce construction costs. For example, by storing scanned sensor data and location data with respect to a reference point, such data can be assessed away from the job site, and be recalled from a stored database at a later time. This can enable off-line forensic assessment of the underlying structures and minimize any need for repetitive scanning in the future. A user can go back to the job site at a later time, equipped with information of the underlying structures relative to a previously used reference point.

Figure 11A:
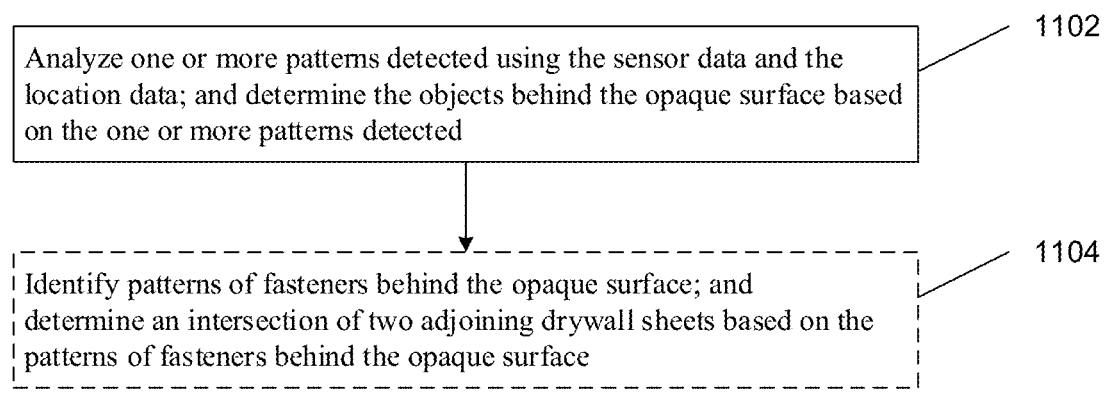
FIG. 11A illustrates an exemplary implementation of analyzing sensor data and location data according to aspects of the present disclosure.

FIG. 11A illustrates an exemplary implementation of analyzing sensor data and location data according to aspects of the present disclosure. As shown in the example of FIG. 11A, in block 1102, the method analyzes one or more patterns detected using the sensor data and the location data;

and determines the objects behind the opaque surface based on the one or more patterns detected. According to aspects of the present disclosure, the methods performed in block 1102 may optionally and/or additionally include the methods performed in block 1104. In block 1104, the method identifies patterns of fasteners behind the opaque surface; and determines an intersection of two adjoining drywall sheets based on the patterns of fasteners behind the opaque surface.

In some applications, location data and sensor data can be used to enable pattern recognition. Patterns may include data from one or more sensors. Virtual pins can be dropped by the user at any point during the scan. These virtual pins can be referenced and returned to in the future for further investigation. For example, dense areas in a vertical pattern can indicate a stud. During a scan process, the method can be configured to allow a user to create waypoints, or drop virtual pins to identify regions of the scan of particular interest. For example, an area of high electromagnetic field may indicate the presence of an electrical fault behind the opaque surface. As another example, a metal sensor can provide more information about a wall than just the location of metal objects. location of a stud can be derived with data collected by metal sensors by following the vertical pattern created by metal fasteners.

Figure 11B:
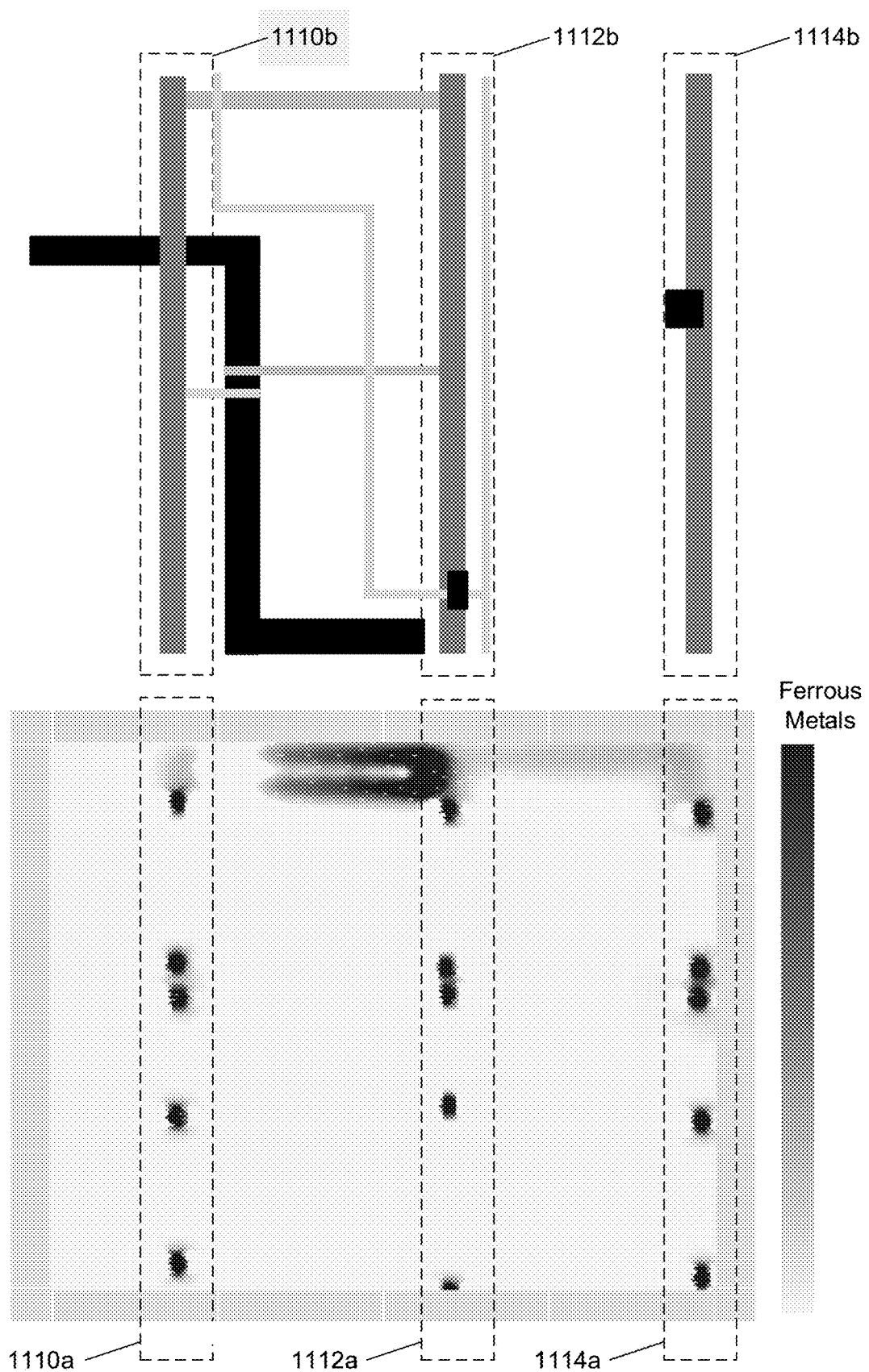
FIG. 11B illustrates exemplary applications of using image patterns of one or more objects behind an opaque surface according to aspects of the present disclosure.

FIG. 11B illustrates exemplary applications of using image patterns of one or more objects behind an opaque surface according to aspects of the present disclosure. In the exemplary applications of FIG. 11B, the upper image shows objects behind an opaque surface with the opaque surface removed. The lower image shows a scanned image with a user selected material, namely ferrous metals, being displayed. In the scanned image, patterns of the fasteners, such as screws and nails, can be seen in three relatively vertical lines, shown in dotted boxes 1110*a*, 1112*a*, and 1114*a* in the lower image. From these patterns, it can be derived that there are three studs behind the opaque surface, as shown in the corresponding dotted boxes 1110*b*, 1112*b*, and 1114*b* in the upper image.

Figure 12A:
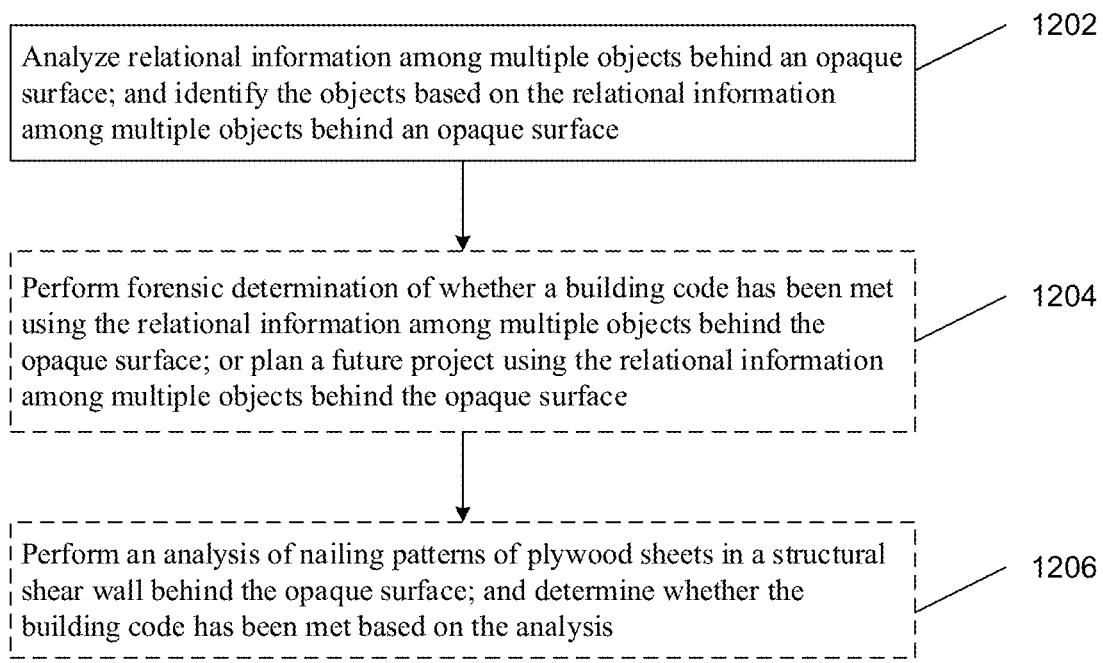
FIG. 12A illustrates another exemplary implementation of analyzing sensor data and location data according to aspects of the present disclosure.

FIG. 12A illustrates another exemplary implementation of analyzing sensor data and location data according to aspects of the present disclosure. As shown in FIG. 12A, in block 1202, the method analyzes relational information among multiple objects behind an opaque surface; and identifies the objects based on the relational information among multiple objects behind an opaque surface. According to aspects of the present disclosure, the methods performed in block 1202 may optionally and/or additionally include the methods performed in block 1204. In block 1204, the method performs forensic determination of whether a building code has been met using the relational information among multiple objects behind the opaque surface; or plans a future project using the relational information among multiple objects behind the opaque surface. According to aspects of the present disclosure, the methods performed in block 1204 may optionally and/or additionally include the methods performed in block 1206. In block 1206, the method performs an analysis of nailing patterns of plywood sheets in a structural shear wall behind the opaque surface; and determines whether the building code has been met based on the analysis. For example, using the relational information of the distances among the studs derived from FIG. 11B, it can be determined whether the studs were placed according to the building code. In another example, using the relational information of nailing patterns of plywood sheets in a structural shear wall, it can be determined whether the building code has been met in the construction process.

According to aspects of the present disclosure, location data and sensor data collected by the location tracker and sensor device can be displayed on the same topographic grid, thereby showing elements behind an opaque surface in relation to each other as well as their grid position in the space behind the opaque surface. This information can be used in forensic analysis of architectural conformity, code compliance, structural integrity, cost estimation prior to commencement of a construction project, and post construction assessment of sound engineering practice and construction quality.

Figure 12B:
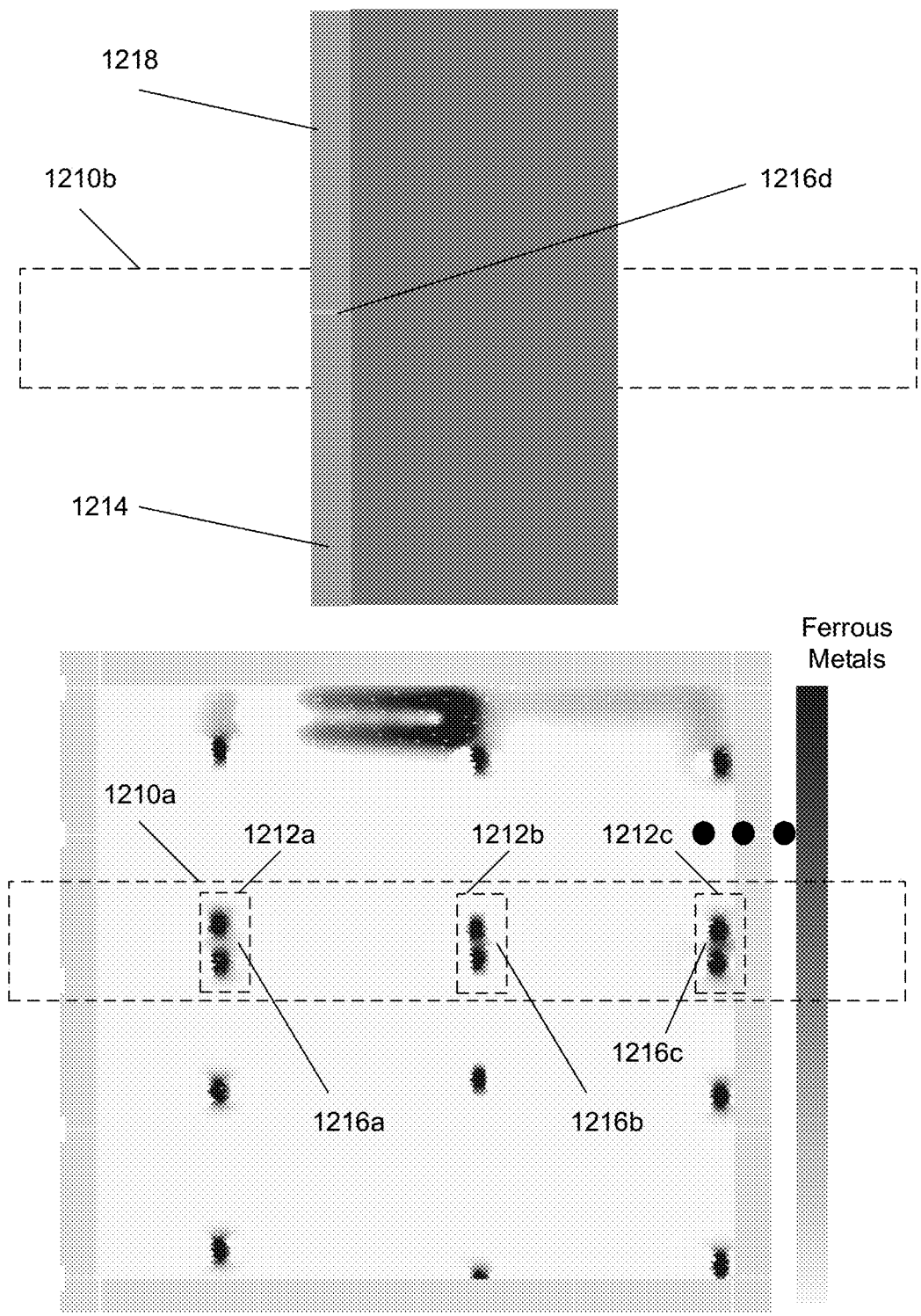
FIG. 12B illustrates exemplary applications of using relational information of one or more objects behind an opaque surface according to aspects of the present disclosure.

FIG. 12B illustrates exemplary applications of using relational information of one or more objects behind an opaque surface according to aspects of the present disclosure. In the exemplary applications of FIG. 12B, the upper image shows a side view of a stud and drywall sheets attached to the stud. The lower image shows a scanned image of a front view of the same wall. Note that a tape join is an intersection of two adjoining drywall sheets. Screws are placed along the edge of the drywall sheets to secure the material. Plaster is then placed into the crevasse and tape is placed over the plaster to create a smooth transition between the two pieces of drywall sheets.

In this example, relational information of objects, such as two fasteners within close proximity from each other as highlighted in dotted box 1210*a*, can be seen in the lower image. Within the dotted box 1210*a*, patterns of adjacent fasteners, shown in dotted box 1212*a*, 1212*b* and 1212*c*, provide relational information of the objects behind the wall. From this relational information, it can be derived that there is an intersection of two adjoining drywall sheets behind the wall. The line of the intersection is in between each pair of adjacent fasteners, as approximately indicated at points 1216*a*, 1216*b*, and 1216*c*. In the corresponding upper image, dotted box 1210*b* indicates the intersection of two adjoining drywall sheets 1214 and 1218 behind an opaque surface, with point 1216*d* approximately indicating the line of intersection.

Figure 12C:
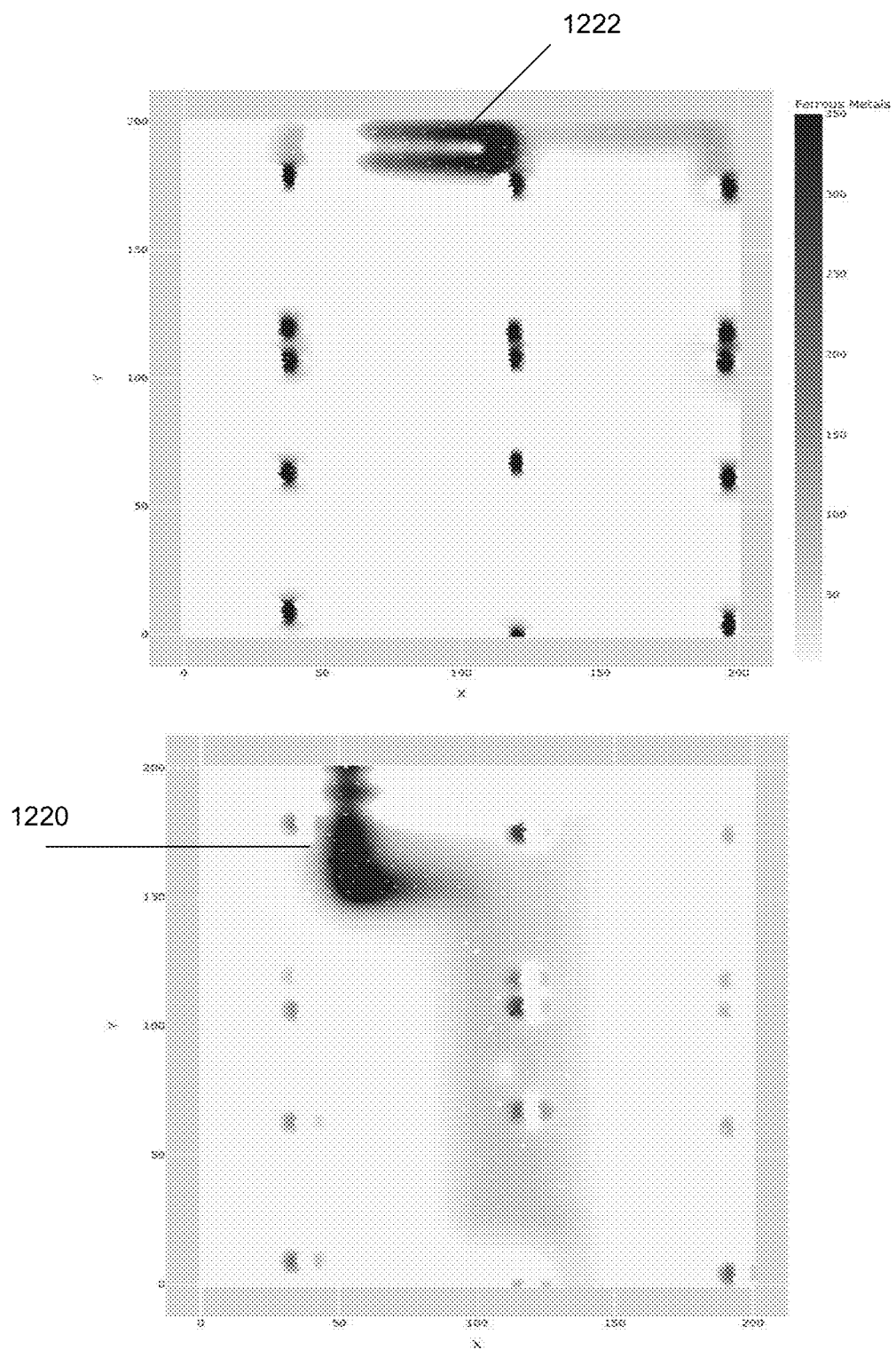
FIG. 12C illustrates another exemplary application of using relational information of one or more objects behind an opaque surface according to aspects of the present disclosure.

FIG. 12C illustrates another exemplary application of using relational information of one or more objects behind an opaque surface according to aspects of the present disclosure. In the example of FIG. 12C, the upper image shows a first scanned image with a user selected material, namely ferrous metals, being displayed. The lower image shows a second scanned image with a user selected material, namely non-ferrous metals, being displayed. Note that ferrous metals include metals or alloys that contain iron. Examples of ferrous metal may include steel, carbon steel, and cast iron. The upper image shows a steel strap and screws detected behind a wall. Non-ferrous metals do not contain iron. Examples of non-ferrous metals may include copper, aluminum, lead, zinc, silver, gold, nickel, titanium, and brass. The lower image shows a copper pipe and screws detected behind the same wall.

The scanned images provide relational information of the objects behind the wall. From the relational information, it can be derived that there is a copper pipe 1220 behind the wall and the copper pipe is tied down by a steel strap 1222 in between two studs, which are indicated by the patterns of the fasteners as described above in association with FIG. 11B. This information can be used to verify whether the objects behind the opaque surface were constructed according to a building code.

Figure 13A:
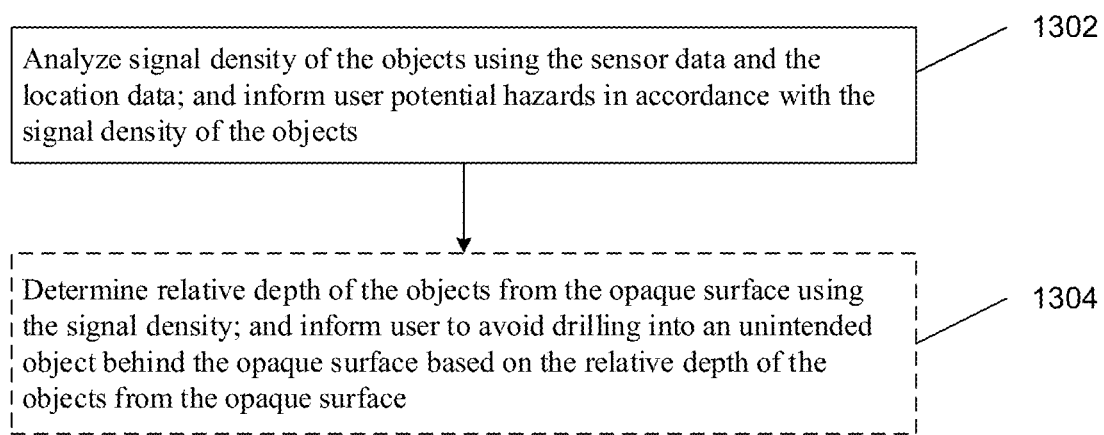
FIG. 13A illustrates yet another exemplary implementation of analyzing sensor data and location data according to aspects of the present disclosure.

FIG. 13A illustrates yet another exemplary implementation of analyzing sensor data and location data according to aspects of the present disclosure. As shown in FIG. 13A, in block 1302, the method analyzes signal density of the objects using the sensor data and the location data; and informs user potential hazards in accordance with the signal density of the objects. According to aspects of the present disclosure, the methods performed in block 1302 may optionally and/or additionally include the methods performed in block 1304. In block 1304, the method determines relative depth of the objects from the opaque surface using the signal density; and informs users to avoid drilling into an unintended object behind the opaque surface based on the relative depth of the objects from the opaque surface.

According to aspects of the present disclosure, signal density can be used to determine the relative depth of objects behind an opaque surface, which in turn can be used to determine potential risks or hazards of interference with existing subsurface elements prior to perform a measured penetration of the opaque surface with a saw or a drill. Note that a larger amplitude of signal density can indicate an object is closer to the sensor; and a smaller amplitude of signal density can indicate an object is farther away from the sensor.

Figure 13B:
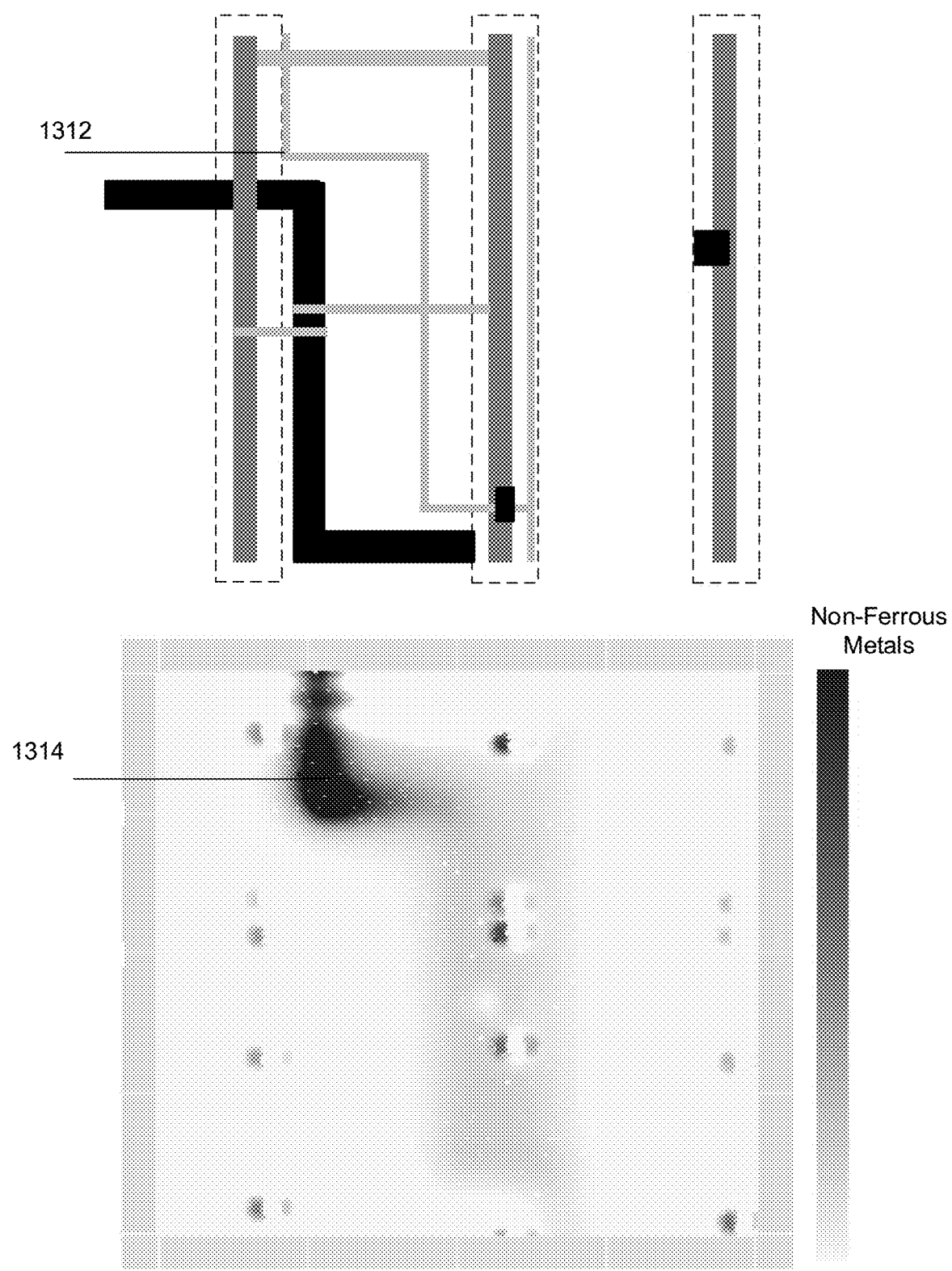
FIG. 13B illustrates an exemplary application of using signal density of one or more objects behind an opaque surface according to aspects of the present disclosure.

FIG. 13B illustrates an exemplary application of using signal density of one or more objects behind an opaque surface according to aspects of the present disclosure. In the exemplary application of FIG. 13B, the upper image shows objects behind an opaque surface with the opaque surface removed. The lower image shows a scanned image with a user selected material, namely non-ferrous metals, being displayed. In these two images, the object of interest is a copper pipe 1312 shown in the upper image, with its corresponding signal density 1314 shown in the lower scanned image. In the lower image, areas with higher signal density (shown as darker areas) indicate the copper pipe 1312 may be closer to the opaque surface, and areas with lower signal density (shown as lighter areas) indicate the copper pipe 1312 may be farther away from the opaque surface. Using the signal density information, a user may choose an area that avoids the copper pipe to drill or cut into the wall, which results in reducing potential risks and hazards. Note that a similar technique may be employed with respect to other objects, such as electrical wires and plastic pipes. In those cases, the user may select a desired material to be displayed. With the guidance of a scanned image of signal density of the user selected material, potential risks and hazards may be reduced during remodeling or construction.

Figure 13C:
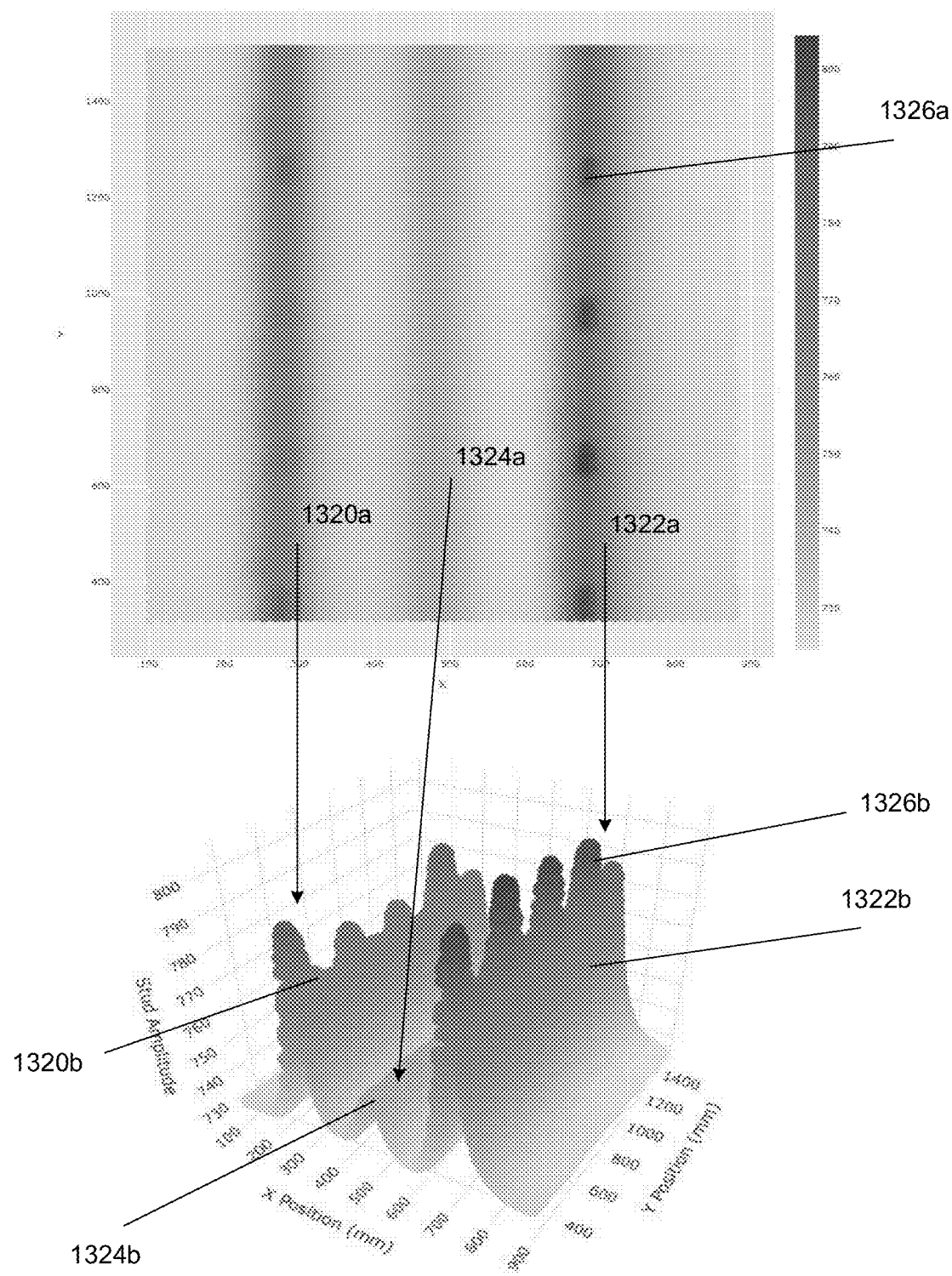
FIG. 13C illustrates another exemplary application of using signal density of one or more objects behind an opaque surface according to aspects of the present disclosure.

FIG. 13C illustrates another exemplary application of using signal density of one or more objects behind an opaque surface according to aspects of the present disclosure. In the exemplary application of FIG. 13C, the upper image shows a two dimensional signal density of objects behind an opaque surface. The lower image shows a three dimensional signal density of the objects behind the opaque surface. In this example, the upper image shows two studs (1320*a* and 1322*a*) and a plastic pipe 1324*a*, and the corresponding three dimension signal density profile of the studs (1320*b* and 1322*b*) and the plastic pipe 1324*b* are shown in the lower image. The signal density may be higher where there is a screw in the stud. For example, this is indicated by a darker area 1326*a* in the upper two dimensional image, and by a bump 1326*b* in the lower three dimensional image. Similar to the example of FIG. 13B, using the signal density information, a user may choose an area to drill or cut into the wall in order to reduce potential risks and hazards.

Figure 13D:
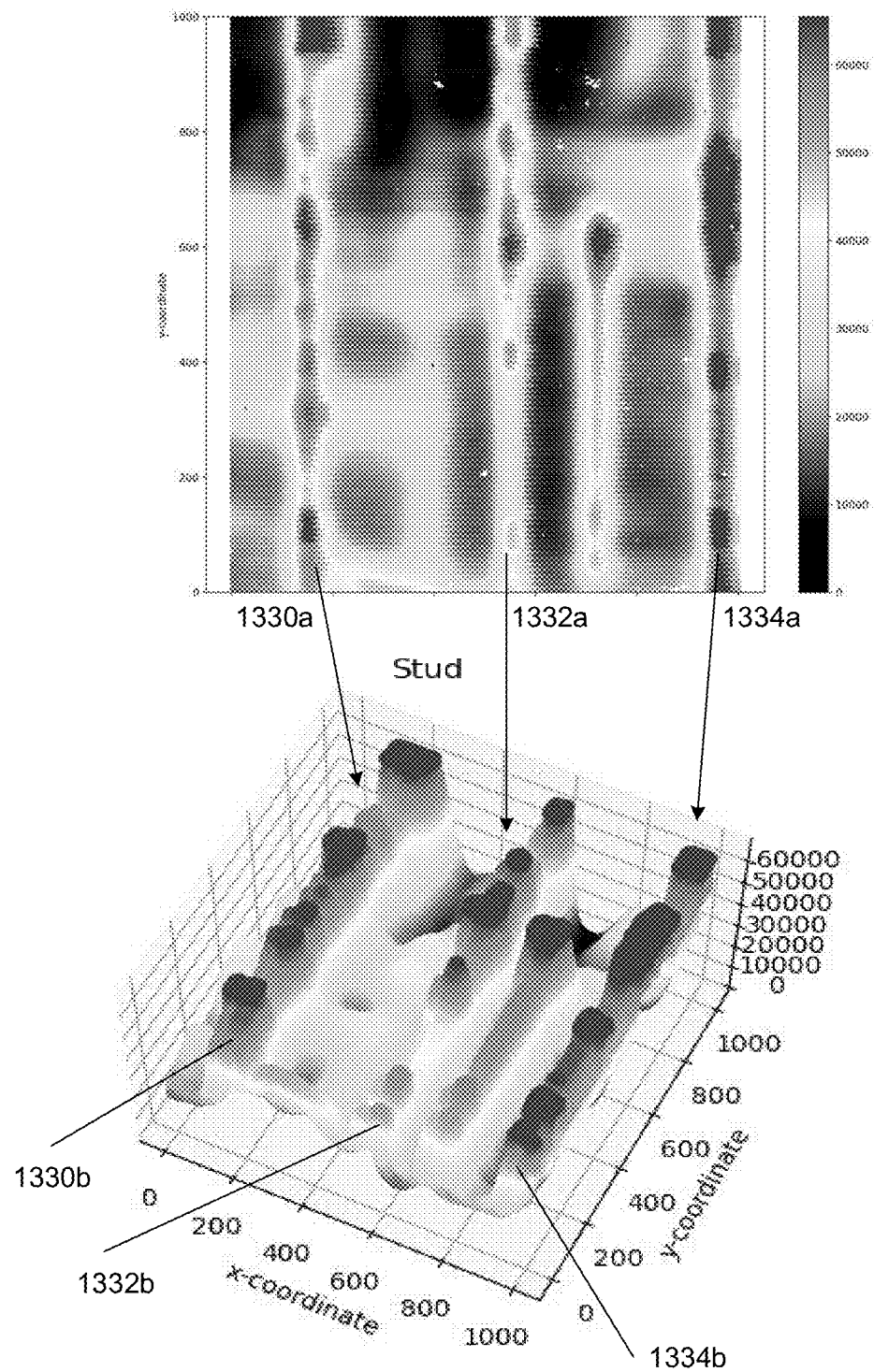
FIG. 13D illustrates yet another exemplary application of using signal density of one or more objects behind an opaque surface according to aspects of the present disclosure.

FIG. 13D illustrates yet another exemplary application of using signal density of one or more objects behind an opaque surface according to aspects of the present disclosure. In the example of FIG. 13D, the upper image shows a two dimensional signal density collected by capacitive sensors about objects behind an opaque surface. The lower image shows a three dimensional signal density by the capacitive sensors about the objects behind the opaque surface. In this example, the upper image shows the two dimensional signal density profile of three studs (1330*a* 1332*a* and 1334*a*), and the corresponding three dimension signal density profile of the studs (1330*b* 1332*b* and 1334*b*). The signal density may be higher where a screw or other metal may be in a stud or on top of the stud. Similar to the example of FIG. 13B, using the signal density information, a user may choose an area to drill or cut into the wall in order to reduce potential risks and hazards.

Figure 14:
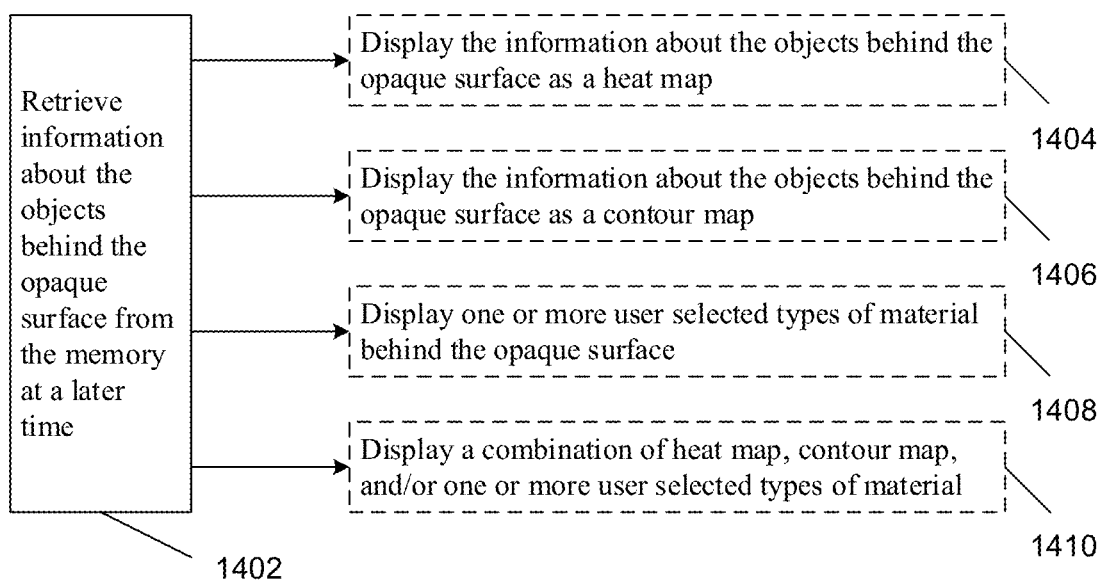
FIG. 14 illustrates a method of communicating information about the objects behind an opaque surface according to aspects of the present disclosure.

FIG. 14 illustrates a method of communicating information about the objects behind an opaque surface according to aspects of the present disclosure. As shown in FIG. 14, in block 1402, the method retrieves the information about the objects behind the opaque surface from the memory at a later time. According to aspects of the present disclosure, the methods performed in block 1402 may optionally and/or additionally include the methods performed in blocks 1404, 1406, 1408, and 1410. In block 1404, the method displays the information about the objects behind the opaque surface as a heat map. In block 1406, the method displays the information about the objects behind the opaque surface as a contour map. In block 1408, the method displays one or more user selected types of material behind the opaque surface. In block 1410, the method displays a combination of heat map, contour map, and/or one or more user selected types of material.

With the disclosed apparatus and method, information may be shared with contractors without need for them to visit a construction or project site; and incomplete or work-in-progress information may be saved when a project is delayed, etc. This enables a team to return to a previous work site and retrieve the relevant information to continue an unfinished project.

In addition, location data and sensor data may be presented in multiple ways to the user. For example, if a user is searching for a wood stud, then information about wood stud can be emphasized, while information about other types of objects or materials may be filtered out. Similarly, if a user is searching for metallic pipe, or live electrical wire, these targets can be emphasized, and other types of objects or materials may be filtered out. In some other applications, different layers of information may be extracted from the underlying data set to create layers of the images for display.

According to aspects of the present disclosure, another application of the disclosed apparatus and method can be used for Building Information Modeling (BIM). BIM is the holistic process of creating and managing information for a built asset. Based on an intelligent model and enabled by a cloud platform, BIM integrates structured, multi-disciplinary data to produce a digital representation of an asset across its lifecycle, from planning and design to construction and operations. BIM allows design and construction teams to work more efficiently, but it also allows them to capture the data they have created during the process to benefit operations and maintenance activities for the life cycle of the project.

It will be appreciated that the above descriptions for clarity have described embodiments of the invention with reference to different functional units and controllers. However, it will be apparent that any suitable distribution of functionality between different functional units or processors or controllers may be used without detracting from the invention. For example, functionality illustrated to be performed by separate processor(s) or controller(s) may be performed by the same processor(s) and/or controller(s) included with the unit. In another exemplary embodiment, functionality illustrated to be performed by the processor and/or controller or the display may be performed by an independent and/or remote receiving device that may be able to display the information and/or provide a means accessible to the user. Hence, references to specific functional units are to be seen as references to suitable means for providing the described functionality rather than indicative of a strict logical or physical structure or organization.

The invention can be implemented in any suitable form, including hardware, software, firmware, or any combination of these. The invention may optionally be implemented partly as computer software running on one or more data processors and/or digital signal processors, along with the hardware components described above. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors/controllers.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. A method for mapping objects behind an opaque surface, comprising:
    generating location data by a location tracker, wherein the location data includes pairs of horizontal and vertical location data relative to a point of reference that is linked to the opaque surface; wherein the location tracker includes a first arm configured to control movements of the sensor device in a horizontal direction and a second arm configured to control movements of the sensor device in a vertical direction; and wherein the location tracker is configured to scan an area of the opaque surface one time, or to scan the area of the opaque surface a predetermined number of times;
    collecting sensor data corresponding to the location data in parallel, by a sensor device comprising one or more sensors and held by the location tracker, of the objects behind the opaque surface along a programmed scan path;
    storing, in a memory, the sensor data and the location data;
    analyzing, by one or more processors, the sensor data and the location data to identify information about the objects behind the opaque surface; and
    communicating, via a user interface, the information about the objects behind the opaque surface to a user.

2. The method of claim 1, wherein the sensor data comprises at least one of:
    sensor data collected by one or more capacitive sensors;
    sensor data collected by one or more metal sensors;
    sensor data collected by one or more current sensors, or a combination thereof.

3. The method of claim 1, wherein analyzing the sensor data and the location data comprises:
    analyzing one or more patterns detected using the sensor data and the location data;
    determining the objects behind the opaque surface based on the one or more patterns detected.

4. The method of claim 3, further comprising:
    identifying patterns of fasteners behind the opaque surface; and
    determining an intersection of two adjoining drywall sheets based on the patterns of fasteners behind the opaque surface.

5. The method of claim 1, wherein analyzing the sensor data and the location data further comprises:
    analyzing relational information among multiple objects behind an opaque surface; and
    identifying the objects based on the relational information among multiple objects behind an opaque surface.

6. The method of claim 5, further comprising:
    performing forensic determination of whether a building code has been met using the relational information among multiple objects behind the opaque surface; or
    planning a future project using the relational information among multiple objects behind the opaque surface.

7. The method of claim 6, wherein performing forensic determination comprises:
    performing an analysis of nailing patterns of plywood sheets in a structural shear wall behind the opaque surface; and
    determining whether the building code has been met based on the analysis.

8. The method of claim 1, wherein analyzing the sensor data and the location data further comprises:
    analyzing signal density of the objects using the sensor data and the location data; and
    informing the user potential hazards in accordance with the signal density of the objects.

9. The method of claim 8, further comprising:
    determining relative depth of the objects from the opaque surface using the signal density; and
    informing the user to avoid drilling into an unintended object behind the opaque surface based on the relative depth of the objects from the opaque surface.

10. The method of claim 1, wherein communicating the information about the objects behind the opaque surface comprises:
    retrieving the information about the objects behind the opaque surface from the memory at a later time.

11. The method of claim 10, further comprises at least one of:
    displaying the information about the objects behind the opaque surface as a heat map;
    displaying the information about the objects behind the opaque surface as a contour map;
    displaying one or more user selected types of material behind the opaque surface; or
    a combination thereof.

12. An apparatus for mapping objects behind an opaque surface, comprising:
    a location tracker configured to generate location data, wherein the location data includes pairs of horizontal and vertical location data relative to a point of reference that is linked to the opaque surface; wherein the location tracker includes a first arm configured to control movements of the sensor device in a horizontal direction and a second arm configured to control movements of the sensor device in a vertical direction; and wherein the location tracker is configured to scan an area of the opaque surface one time, or to scan the area of the opaque surface a predetermined number of times;

a sensor device configured to collect sensor data of the objects behind the opaque surface along a programmed scan path, wherein the sensor data corresponds to the location data, and wherein the sensor device comprises one or more sensors and is held by the location tracker;

a memory configured to store the sensor data and the location data;

one or more processors configured to analyze the sensor data and the location data to identify information about the objects behind the opaque surface; and a user interface configured to communicate the information about the objects behind the opaque surface to a user.

13. The apparatus of claim 12, wherein the sensor data comprises at least one of:
sensor data collected by one or more capacitive sensors;
sensor data collected by one or more metal sensors;
sensor data collected by one or more current sensors, or a combination thereof.

14. The apparatus of claim 12, wherein the one or more processors are further configured to:
analyze one or more patterns detected using the sensor data and the location data;
determine the objects behind the opaque surface based on the one or more patterns detected.

15. The apparatus of claim 14, wherein the one or more processors are further configured to:
identify patterns of fasteners behind the opaque surface; and
determine an intersection of two adjoining drywall sheets based on the patterns of fasteners behind the opaque surface.

16. The apparatus of claim 12, wherein the one or more processors are further configured to:
analyze relational information among multiple objects behind an opaque surface; and
identify the objects based on the relational information among multiple objects behind an opaque surface.

17. The apparatus of claim 16, wherein the one or more processors are further configured to:
perform forensic determination of whether a building code has been met using the relational information among multiple objects behind the opaque surface; or
plan a future project using the relational information among multiple objects behind the opaque surface.

18. The apparatus of claim 17, wherein the one or more processors are further configured to:
perform an analysis of nailing patterns of plywood sheets in a structural shear wall behind the opaque surface; and
determine whether the building code has been met based on the analysis.

19. The apparatus of claim 12, wherein the one or more processors are further configured to:
analyze signal density of the objects using the sensor data and the location data; and
inform the user potential hazards in accordance with the signal density of the objects.

20. The apparatus of claim 19, wherein the one or more processors are further configured to:
determine relative depth of the objects from the opaque surface using the signal density; and
inform the user to avoid drilling into an unintended object behind the opaque surface based on the relative depth of the objects from the opaque surface.

21. The apparatus of claim 12, wherein the one or more processors are further configured to:
retrieve the information about the objects behind the opaque surface from the memory at a later time.

22. The apparatus of claim 21, wherein the user interface is further configured to:
display the information about the objects behind the opaque surface as a heat map;
display the information about the objects behind the opaque surface as a contour map;
display one or more user selected types of material behind the opaque surface; or
a combination thereof.

* * * * *